United States Patent
Torii et al.

(10) Patent No.: US 9,606,613 B2
(45) Date of Patent: Mar. 28, 2017

(54) SYSTEM AND METHOD FOR SHIFTING IMAGE DISPLAY APPARATUS TO ENERGY-SAVING STATE BASED ON RESULT OF DETECTION OF DATA INPUT AND OPERATION ON THE IMAGE DISPLAY APPARATUS WITHIN A PREDETERMINED TIME PERIOD

(71) Applicants: Osamu Torii, Kanagawa (JP); Daisuke Sakai, Tokyo (JP)

(72) Inventors: Osamu Torii, Kanagawa (JP); Daisuke Sakai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 126 days.

(21) Appl. No.: 14/593,327

(22) Filed: Jan. 9, 2015

(65) Prior Publication Data
US 2015/0212567 A1 Jul. 30, 2015

(30) Foreign Application Priority Data
Jan. 30, 2014 (JP) ................. 2014-015273

(51) Int. Cl.
*G06F 1/00* (2006.01)
*G06F 1/32* (2006.01)
(Continued)

(52) U.S. Cl.
CPC .......... *G06F 1/3284* (2013.01); *G06F 1/3215* (2013.01); *G06F 1/3265* (2013.01);
(Continued)

(58) Field of Classification Search
CPC .... G06F 1/3203; G06F 1/3228; G06F 1/3287; G06F 1/3215; G06F 1/3262;
(Continued)

(56) References Cited

U.S. PATENT DOCUMENTS

2006/0087503 A1* 4/2006 Sasaki ............ G09G 5/00 345/211
2008/0165377 A1* 7/2008 Ishii ............ H04N 1/00885 358/1.9

(Continued)

FOREIGN PATENT DOCUMENTS

JP 2012-010289 1/2012

*Primary Examiner* — Xuxing Chen
(74) *Attorney, Agent, or Firm* — Oblon, McClelland, Maier & Neustadt, L.L.P.

(57) ABSTRACT

An image display apparatus capable of performing communications via a network includes an energy-saving state shifting part to shift an energy state to an energy-saving state in which energy consumption is suppressed, a shifting time setting part to set a time required for shifting to the energy-saving state in accordance with a state or an environment of the image display apparatus, a data input detector to detect presence or absence of data input into the image display apparatus, and an operations detector to detect whether an operation on the image display apparatus is being performed by a user. When neither data input nor operation performed on the image display apparatus is detected by the operations detector, and when the time required for shifting to the energy-saving state set by the shifting time setting part has elapsed, the energy-saving state shifting part shifts the energy state to the energy-saving state.

15 Claims, 25 Drawing Sheets

(51) Int. Cl.
  *G06F 1/20* (2006.01)
  *H04N 1/00* (2006.01)
  *H04N 21/41* (2011.01)

(52) U.S. Cl.
  CPC ............ *G06F 1/203* (2013.01); *G06F 1/3203* (2013.01); *G06F 1/3218* (2013.01); *G06F 1/3228* (2013.01); *G06F 1/3262* (2013.01); *G06F 1/3287* (2013.01); *H04N 1/00129* (2013.01); *H04N 1/00225* (2013.01); *H04N 1/00233* (2013.01); *H04N 1/00896* (2013.01); *H04N 21/4122* (2013.01); *H04N 2201/0089* (2013.01); *Y02B 60/1242* (2013.01); *Y02B 60/1267* (2013.01)

(58) Field of Classification Search
  CPC ...... G06F 1/3284; G06F 1/203; G06F 1/3218; G06F 1/3265; Y02B 60/1267; Y02B 60/1242; H04N 1/00896; H04N 21/4122; H04N 1/00225; H04N 1/00233; H04N 1/00129; H04N 2201/0089
  See application file for complete search history.

(56) References Cited

U.S. PATENT DOCUMENTS

| | | | |
|---|---|---|---|
| 2009/0210732 A1* | 8/2009 | Aoyagi | H04N 1/00885 713/320 |
| 2011/0131436 A1* | 6/2011 | Ogashiwa | G03G 15/5004 713/323 |
| 2011/0273737 A1* | 11/2011 | Hirao | G06F 21/105 358/1.14 |
| 2014/0002844 A1* | 1/2014 | Miyamoto | G06K 15/4055 358/1.13 |
| 2014/0176918 A1* | 6/2014 | Ozawa | G03B 21/2053 353/85 |

* cited by examiner

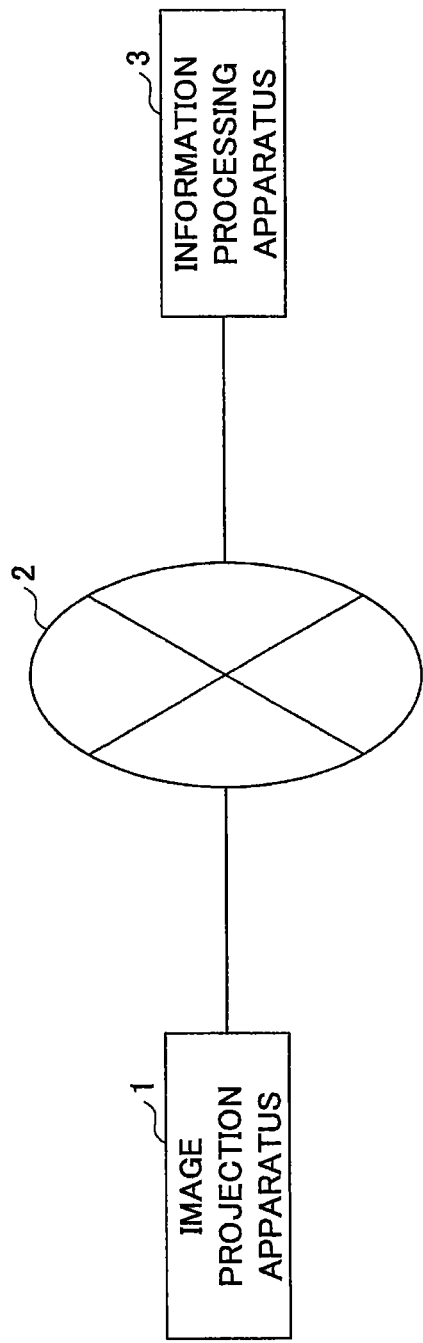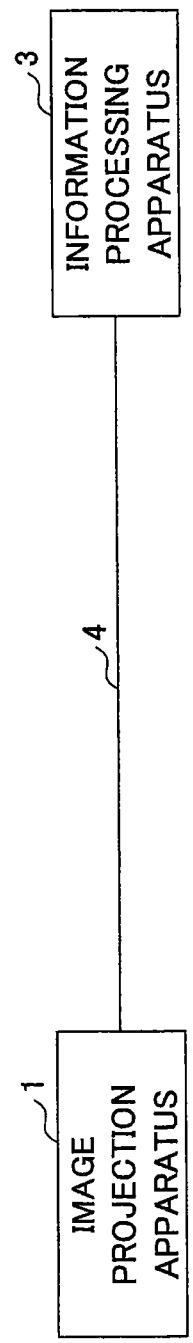

FIG.5

| COMMUNICATION CAPABILITY STATUS | TIME REQUIRED FOR SHIFTING TO ENERGY-SAVING MODE |
|---|---|
| CAPABLE | 5 MIN. |
| INCAPABLE | 3 MIN. |

FIG.10

| COMMUNICATION CAPABILITY STATUS | PRESENCE OR ABSENCE OF COMMUNICATION APPARATUS | TIME REQUIRED FOR SHIFTING TO ENERGY-SAVING MODE |
|---|---|---|
| CAPABLE | PRESENCE | 5 MIN. |
| CAPABLE | ABSENCE | 3 MIN. |
| INCAPABLE | — | 3 MIN. |

FIG.13

| COMMUNICATION CAPABILITY STATUS | UNEXECUTABLE PROCESS REQUEST IN ENERGY-SAVING MODE | TIME REQUIRED FOR SHIFTING TO ENERGY-SAVING MODE |
|---|---|---|
| CAPABLE | PRESENCE | 5 MIN. |
| CAPABLE | ABSENCE | 3 MIN. |
| INCAPABLE | — | 3 MIN. |

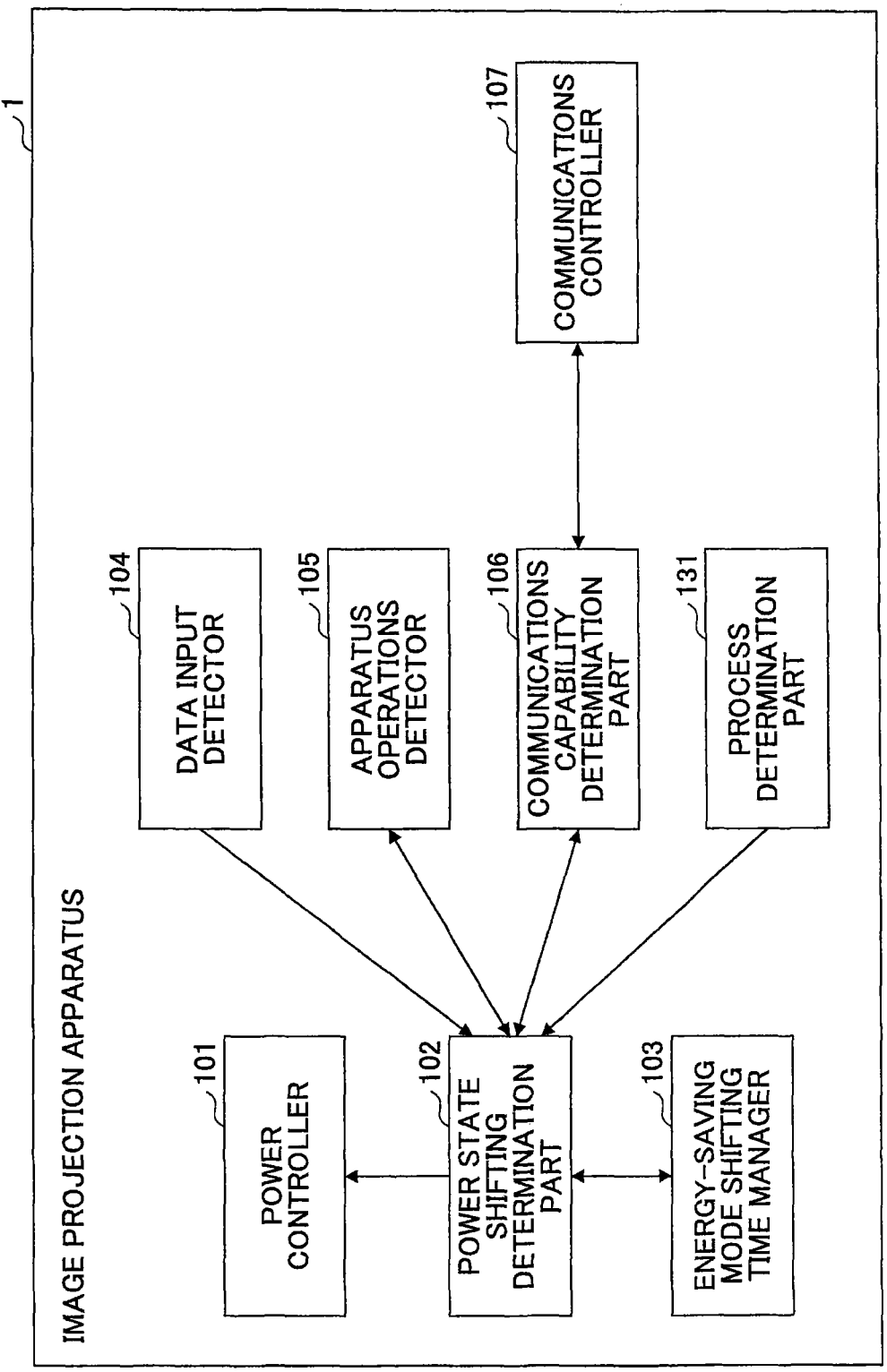

FIG.16

| COMMUNICATION CAPABILITY STATUS | UNEXECUTABLE PROCESS STATUS IN ENERGY-SAVING MODE | TIME REQUIRED FOR SHIFTING TO ENERGY-SAVING MODE |
|---|---|---|
| CAPABLE | IN PROGRESS | - |
| CAPABLE | NONE | 5 MIN. |
| INCAPABLE | IN PROGRESS | - |
| INCAPABLE | NONE | 3 MIN. |

FIG.17

| SUBSCRIBED UNEXECUTABLE PROCESS IN ENERGY-SAVING MODE | START TIME OF UNEXECUTABLE PROCESS IN ENERGY-SAVING MODE | SHIFT TO ENERGY-SAVING MODE |
|---|---|---|
| PRESENCE | START WITHIN 5 MIN. | - |
| PRESENCE | START AFTER 5 MIN. | 3 MIN. |
| ABSENCE | - | 3 MIN. |

| REMAINING LAMP USABLE TIME | TIME REQUIRED FOR SHIFTING TO ENERGY-SAVING MODE |
|---|---|
| 100 HOURS OR MORE | 5 MIN. |
| LESS THAN 100 HOURS | 3 MIN. |

| NUMBER OF PROCESS UNEXECUTABLE TIMES IN ENERGY-SAVING MODE IN SPECIFIED TIME PERIOD | TIME REQUIRED FOR SHIFTING TO ENERGY-SAVING MODE |
|---|---|
| 1 OR MORE | 5 MIN. |
| NONE | 3 MIN. |

| NUMBER OF PROCESS UNEXECUTABLE TIMES IN ENERGY-SAVING MODE IN SPECIFIED TIME PERIOD | TIME REQUIRED FOR SHIFTING TO ENERGY-SAVING MODE |
|---|---|
| 1 OR MORE | 5 MIN. |
| NONE | 3 MIN. |

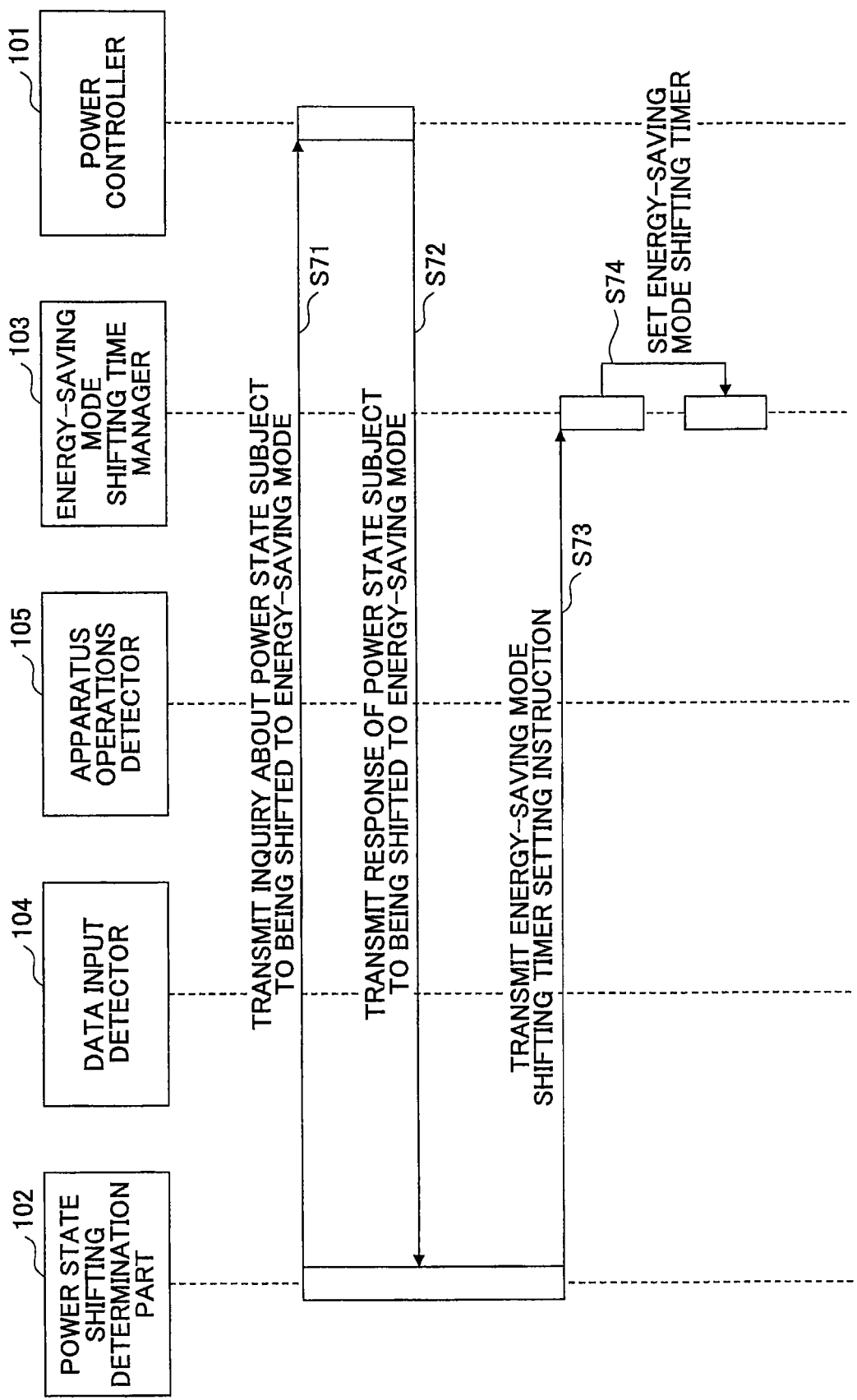

SYSTEM AND METHOD FOR SHIFTING IMAGE DISPLAY APPARATUS TO ENERGY-SAVING STATE BASED ON RESULT OF DETECTION OF DATA INPUT AND OPERATION ON THE IMAGE DISPLAY APPARATUS WITHIN A PREDETERMINED TIME PERIOD

BACKGROUND OF THE INVENTION

1. Field of the Invention

The disclosures discussed herein relate to an image display apparatus and an image display system.

2. Description of the Related Art

Energy saving has been required for office and home apparatuses along with recent increases in electricity rates due to rises in resources and energy prices.

In the related art image projection apparatuses, there is known in the art a technology to shift an electric energy mode to an energy-saving mode to restrict use of functions of the image projection apparatuses when a no-signal state without user's operations continues for a certain period of time to reduce electric energy consumption (e.g., Patent Document 1).

Although there is known in the related art the above technology to shift the electric energy mode to the energy-saving mode due to the no-signal state for a certain period of time, a period of the no-signal state of the image projection apparatus may vary with scenes in which users use the corresponding image projection apparatus. For example, when a user inputs data into the image projection apparatus via a USB cable, the user simply inserts the USB cable to input data, and hence the no-signal state of the image projection apparatus in this case may be shorter than that of the image projection apparatus in which data are input via a network. On the other hand, when data are input into the image projection apparatus via a network, settings are required in a terminal side network to which the image projection apparatus is connected. Hence, the no-signal state in this case is longer than that of the image projection apparatus in which data are input via the USB cable.

However, in the related art technology to shift the image projection apparatus to the energy-saving mode, time required for shifting from a normal-energy mode to the energy-saving mode is a predetermined time. Hence, electric power may be wasted due to elongated time required for shifting from the normal-energy mode to the energy mode, or the image projection apparatus may shift to the energy mode before the image projection apparatus is used due to insufficient time. Note that the above disadvantageous effects may also be observed in image display apparatuses.

RELATED ART DOCUMENT

Patent Document

Patent Document 1: Japanese Laid-open Patent Publication No. 2012-010289

SUMMARY OF THE INVENTION

Accordingly, it is a general object in one embodiment of the present invention to provide an image display apparatus and an image display system capable of switching an electric power mode in accordance with a state of the image display apparatus or its environment that substantially obviates one or more problems caused by the limitations and disadvantages of the related art.

In one aspect of the embodiment, there is provided an image display apparatus capable of performing communications via a network. The image display apparatus includes an energy-saving state shifting part configured to shift an energy state to an energy-saving state in which energy consumption is suppressed; a shifting time setting part configured to set a time required for shifting to the energy-saving state in accordance with a state or an environment of the image display apparatus; a data input detector configured to detect presence or absence of data input into the image display apparatus; and an operations detector configured to detect whether an operation on the image display apparatus is being performed by a user. In the image display apparatus, when no data input is detected by the data input detector and no operation on the image display apparatus being performed by the user is detected by the operations detector, and when the time required for shifting to the energy-saving state set by the shifting time setting part has elapsed, the energy-saving state shifting part shifts the energy state to the energy-saving state in which energy consumption is suppressed.

Other objects, features and advantages of the present invention will become more apparent from the following detailed description when read in conjunction with the accompanying drawings.

BRIEF DESCRIPTION OF THE DRAWINGS

FIGS. 1A and 1B are diagrams illustrating a configuration example of an image projection system according to an embodiment;

FIG. 5 is a diagram illustrating a configuration example of data used for setting time required for shifting from a normal mode to an energy-saving mode in the first embodiment;

FIG. 10 is a diagram illustrating a configuration example of data used for setting time required for shifting from a normal mode to an energy-saving mode in a first modification of the first embodiment;

FIG. 13 is a diagram illustrating a configuration example of data used for setting time required for shifting from a normal mode to an energy-saving mode in the second modification of the first embodiment;

FIG. 15 is a block diagram illustrating a functional configuration example of an image projection apparatus according to a third modification of the first embodiment;

FIG. 16 is a diagram illustrating a first configuration example of data used for setting time required for shifting from a normal mode to an energy-saving mode in the third modification of the first embodiment;

FIG. 17 is a diagram illustrating a second configuration example of data used for setting time required for shifting from a normal mode to an energy-saving mode in the third modification of the first embodiment;

FIG. 29 is a sequence diagram illustrating a flow for setting an energy mode shifting timer in the fourth embodiment.

DETAILED DESCRIPTION OF THE PREFERRED EMBODIMENTS

In the following, a description is given of embodiments with reference to accompanying drawings; however, the invention is not limited to these embodiments.

FIG. 1 is a diagram illustrating a configuration example of an image projection system according to an embodiment. As illustrated in FIG. 1A, the image projection system may include an image projection apparatus 1, and an information processing apparatus 3 that may be data transmission capably connected via a network 2 such as a local area network (LAN) as illustrated in FIG. 1, or that may be data transmission capably connected via a data transmission channel 4 such as a universal serial bus (USB) as illustrated in FIG. 1B.

The image projection apparatus 1 is configured to project image data received via the data transmission channel 4. Note that the image projection apparatus 1 is not limited to an image projection apparatus, and may be an image display apparatus such as a multifunction peripheral (MFP) or a smart device. The information processing apparatus 3 may, for example, be a personal computer (PC), a smartphone, a tablet PC, and the like, that are configured to transmit image data to be projected to the image projection apparatus 1.

Hardware Configuration

Figure 2:
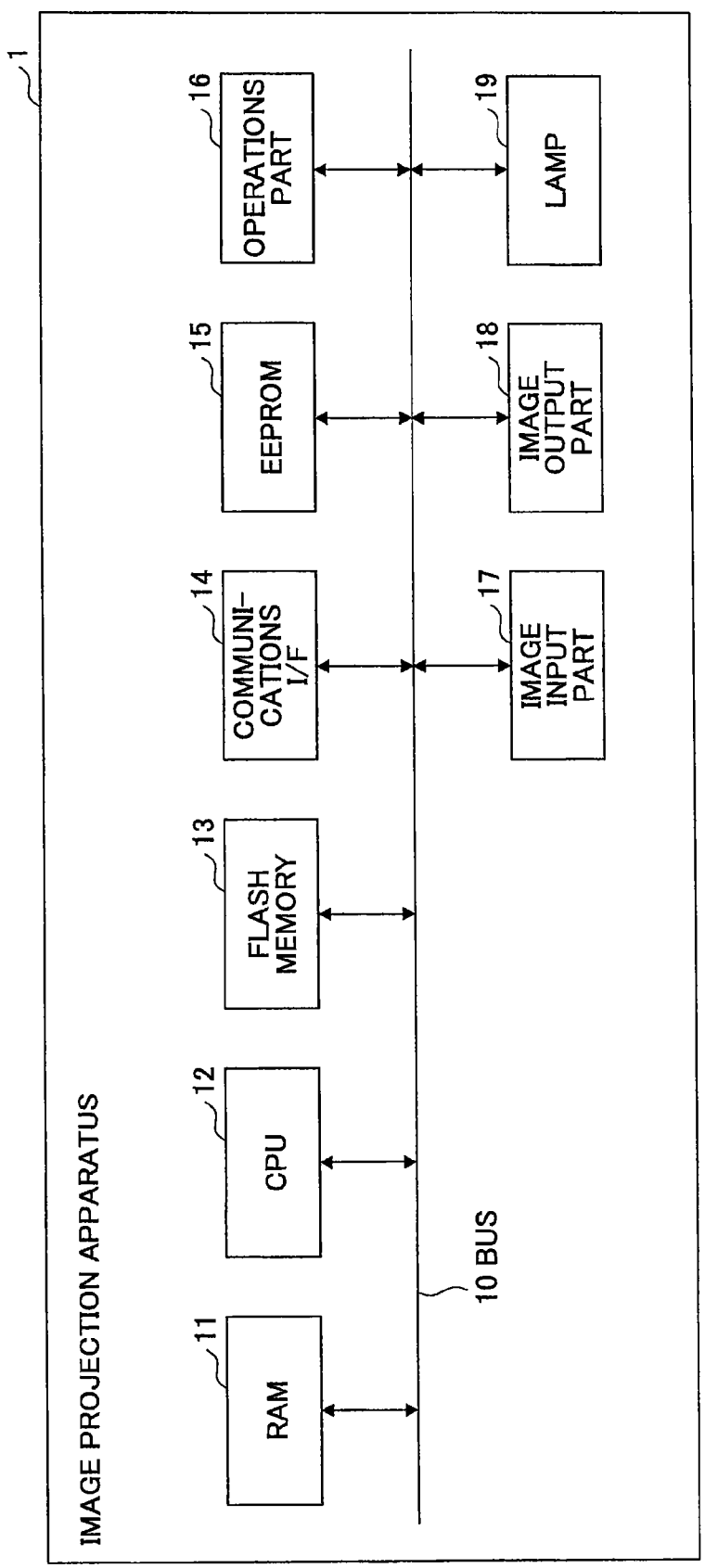
FIG. 2 is a block diagram illustrating a hardware configuration example of an image projection apparatus according to an embodiment.

FIG. 2 is a diagram illustrating hardware of the image projection apparatus 1 constituting the image projection system. The image projection apparatus 1 includes a random access memory (RAM) 11; a central processing unit (CPU) 12; a flash memory 13; a communications interface (I/F) 14; an electrically erasable programmable read-only memory (EEPROM) 15; an operations part 16; an image input part 17; an image output part 18; and a lamp 19 that are connected to one another via a bus 10.

The RAM 11 is configured to store temporarily read programs and data to be executed by the CPU 12. The CPU 12 is configured to execute programs to control the entire apparatus. The flash memory 13 and the EEPROM 15 are configured to store various types of data such as image data and audio (sound) data. The communications I/F 14 is configured to communicate image data with the information processing apparatus 3 via the data transmission channel 4 or the network 2. The operations part 16 is configured to receive operations from a user, and perform operations to adjust brightness of images, volume of sound, and the like. The image input part 17 is configured to receive image data input from the information processing apparatus 3 connected via the communications I/F 14. The image output part 18 may be a liquid crystal display apparatus, and is configured to output the image data received from the image input part 17. The lamp 19 may be a halogen lamp, and is configured to output light so as to project the image data output from the image output part 18 on a projection surface via a not-illustrated projection lens.

Figure 3:
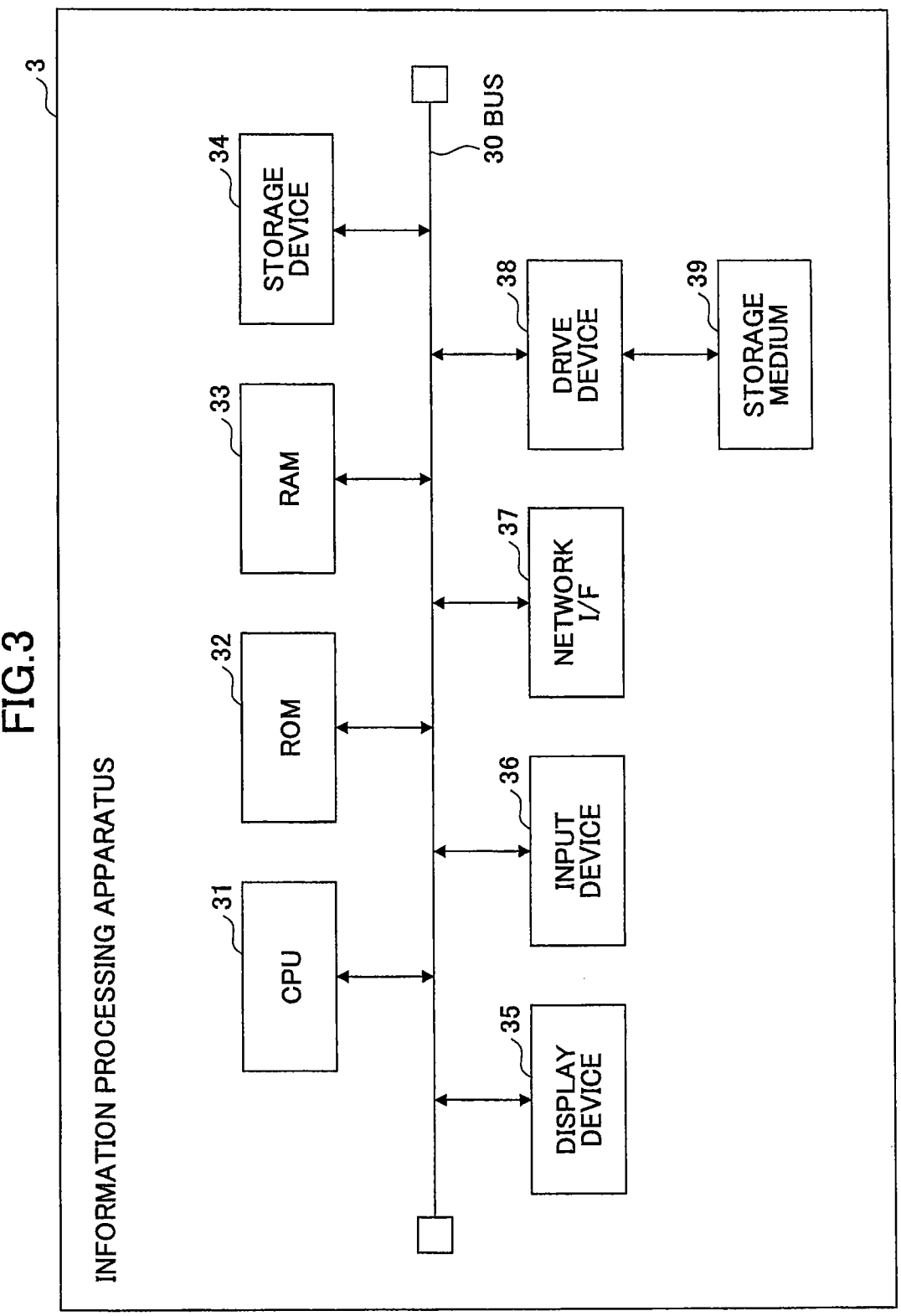
FIG. 3 is a block diagram illustrating a hardware configuration example of an information processing apparatus according to an embodiment.

FIG. 3 is a diagram illustrating hardware of the image projection apparatus 3 constituting the image projection system. The information processing apparatus 3 is configured to includes a CPU 31, a read only memory (ROM) 32, a RAM 33, a storage device 34, a display device 35, an input device 36, a network I/F 37, and a drive device 38 that are connected one another via the bus 30.

The CPU 31 is configured to read programs in the RAM 33 to execute the programs. The ROM 32 is a nonvolatile semiconductor memory (a storage device) capable of maintaining internal data even if the power is turned off. The ROM 32 is configured to store data such as system settings and network-related settings. The RAM 33 is a volatile memory (a storage device) configured to temporarily store programs and data read from the various types of storage devices. The RAM 33 is utilized as a work area (in which programs or data are temporarily loaded) of the CPU 31. The storage device 34 may be a hard disk drive (HDD) or a solid state drive (SSD) having a large capacity of a storage area, and is configured to store and maintain programs or various types of data. The display device 35 may be a display and the like, and is configured to display various types of windows or data. The input device 36 may be a keyboard or a mouse, and is configured to allow a user to input various operations signals into the information processing apparatus 3. The network I/F 37 is utilized for connecting the information processing apparatus 3 to a predetermined data transmission channel or network. The drive device 38 is configured to read data from a storage medium 39, or write data into the storage medium 39. The storage medium 39 may be various types of storage medium such as a compact disk read-only memory (a CD-ROM), and magneto-optical disk.

First Embodiment

Figure 4:
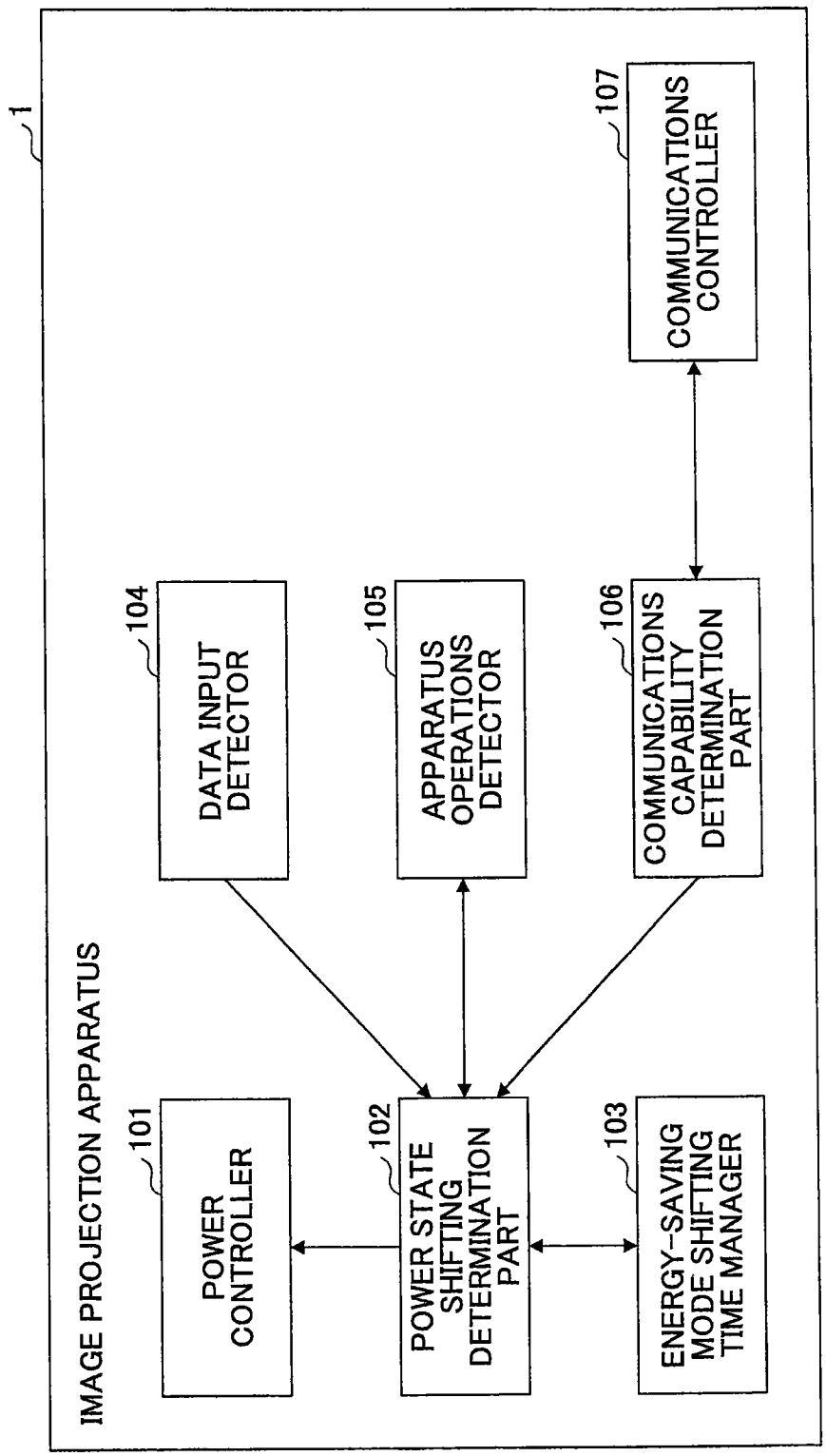
FIG. 4 is a block diagram illustrating a functional configuration example of an image projection apparatus according to a first embodiment.

FIG. 4 is a block diagram illustrating a functional configuration example of an image projection apparatus 1 according to a first embodiment. The image projection apparatus 1 includes a power controller 101, a power state shifting determination part 102, an energy-saving mode shifting time manager 103, a data input detector 104, an apparatus operations detector 105, a communications capability determination part 106, and a communications controller 107.

The power controller 101 is configured to switch a power state (a power mode). The power controller 101 is configured to switch the power state after receiving a power state switching instruction from the power state shifting determination part 102. Further, the power state includes an energy-saving mode in which energy consumption is suppressed, for example, by restricting the use of a specific function, or a normal mode in which no functions are restricted.

The power state shifting determination part 102 is configured to determine a time required for shifting to the energy-saving mode (i.e., time until the power mode is shifted to the energy-saving mode) when no data are input into the image projection apparatus 1, and no operations on the image projection apparatus 1 are performed by the user for a predetermined period. When the time required for shifting to the energy-saving mode has elapsed in a state where there are no data input in the image projection apparatus 1, and no operations on the image projection apparatus 1 are performed by the user, the power state shifting determination part 102 instructs the power state controller 101 to switch the power state to the energy-saving mode.

The time required for shifting to the energy-saving mode may be determined based on whether the image projection apparatus 1 is capable of performing communications, that is, whether the image projection apparatus 1 is in a communication capable status. Whether the image projection apparatus 1 is in the communication capable status is determined by the communications capability determination part 106. The time required for shifting to the energy-saving mode may be set as 3 minutes when the image projection apparatus is in a communication incapable status, and may be set as 5 minutes when the image projection apparatus is in the communication capable status.

Note that the value to be set as a time required for shifting to the energy-saving mode may be input by receiving a user's operation on the main body of the image projection apparatus 1.

Alternatively, the value to be set as a time required for shifting to the energy-saving mode may be set by receiving the user's operation with a keyboard and a mouse on the information processing apparatus 3. Further, the value to be set as a time required for shifting to the energy-saving mode may be set as an initial value in the image projection apparatus 1.

Note that a data table illustrated in FIG. 5 may be maintained for setting the time required for shifting to the energy-saving mode.

When the data input detector 104 or the apparatus operations detector 105 detects data input into the image projection apparatus 1 or the user's operations on the image projection apparatus 1, the power state shifting determination part 102 sends to the power controller 101 an instruction to switch the power state from the energy-saving mode to the normal mode.

The energy-saving mode shifting time manager 103 is configured to manage an energy-saving mode shifting timer indicating a time required for shifting to the energy-saving mode. Specifically, the time required for shifting to the energy-saving mode determined by the power state shifting determination part 102 is set as the energy-saving mode shifting timer. Further, the energy-saving mode shifting time manager 103 inputs data into the image projection apparatus 1 before the energy-saving mode shifting timer expires, or resets the energy-saving mode shifting timer when the user's operations are detected via other function parts.

The data input detector 104 is configured to detect presence or absence of data input via the data transmission channel or via the network. The data input detected by the data input detector 104 includes image data input in the image projection apparatus 1 via the data transmission channel or the network, or data associated with the operations such as sound volume adjustment on the image projection apparatus 1 via the network.

The apparatus operations detector 105 is configured to detect the user's operations with the main body's keys of the image projection apparatus 1 or remote controller's keys. Examples of the operations detected by the apparatus operations detector 105 include sound volume adjustments or luminous intensity adjustments of images performed by the main body's keys of the image projection apparatus 1 or the remote controller's keys.

The communications capability determination part 106 is configured to determine whether the image projection apparatus 1 is in a communication capable status. The determination of whether the image projection apparatus 1 is in a communication capable status is made by checking or detecting, for example, whether a LAN cable is connected to the image projection apparatus 1, whether an access point of a connecting destination is set in the image projection apparatus 1 to perform wireless communications, or whether an IP address necessary for the network connection is set in the image projection apparatus 1.

The communications controller 107 is configured to control data receipt or data transmission via the network. The data receipt or data transmission may be performed using a predetermined protocol with wired or wireless connection.

Figure 6:
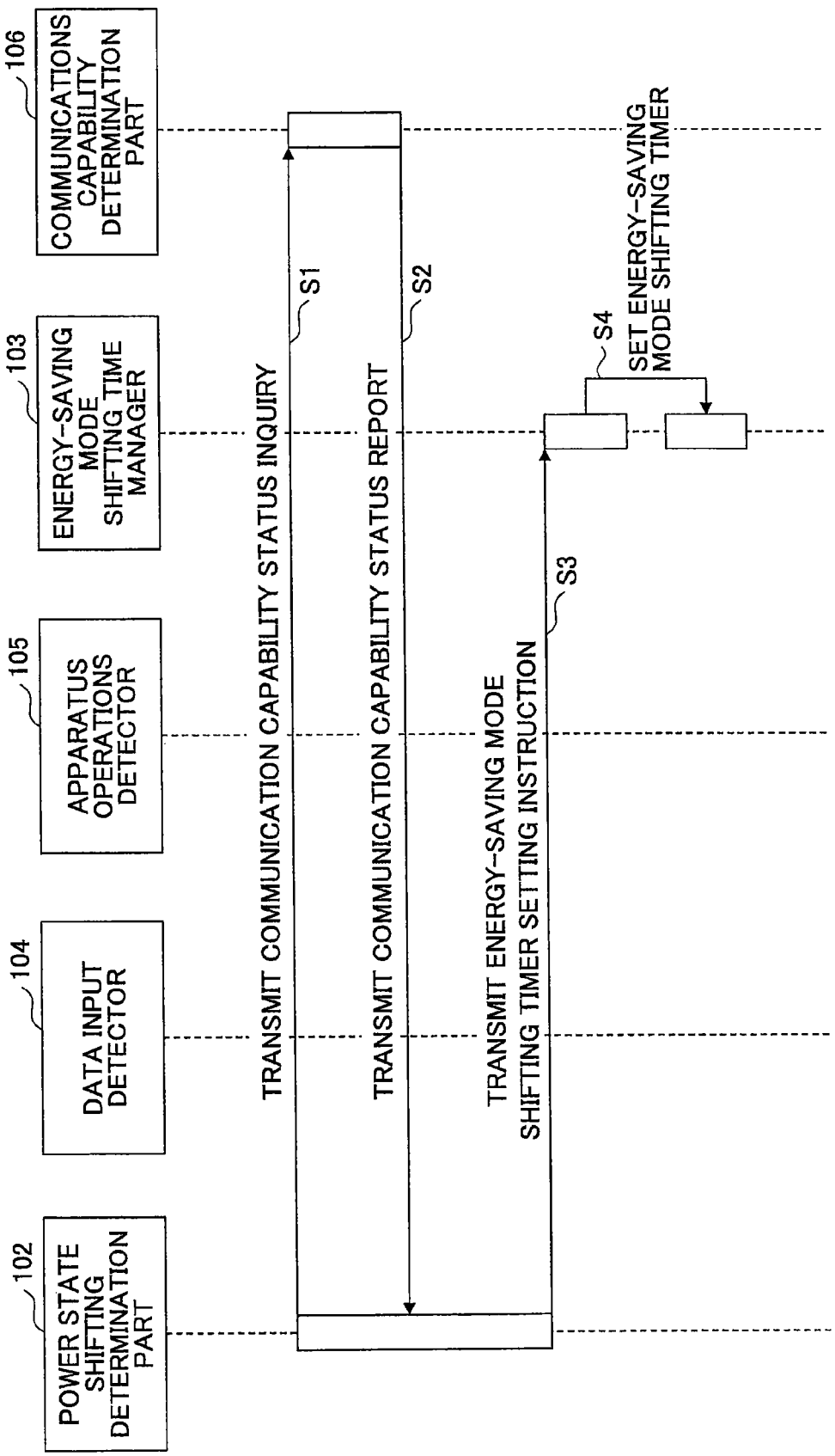
FIG. 6 is a sequence diagram illustrating a flow for setting an energy-saving mode shifting timer in the first embodiment.

FIG. 6 is a sequence diagram illustrating a flow in which the image projection apparatus 1 sets the energy mode shifting timer.

The power state shifting determination part 102 sends an inquiry about whether the image projection apparatus 1 is in a communication capable status to the communications capability determination part 106 (step S1). The power state shifting determination part 106 detects whether the image projection apparatus 1 is in the communication capable status, and sends a resulting report to the power state shifting determination part 102 (step S1). The power state shifting determination part 102 determines the time required for shifting to the energy-saving mode in accordance with information of whether the image projection apparatus 1 is in a communication capable status, and sends a request to the energy-saving mode shifting time manager 103 to set the determined time as the energy-saving mode shifting timer (step S3). The energy-saving mode shifting time manager 103 sets the energy-saving mode shifting timer in accordance with instructions from the power state shifting determination part 102.

Figure 7:
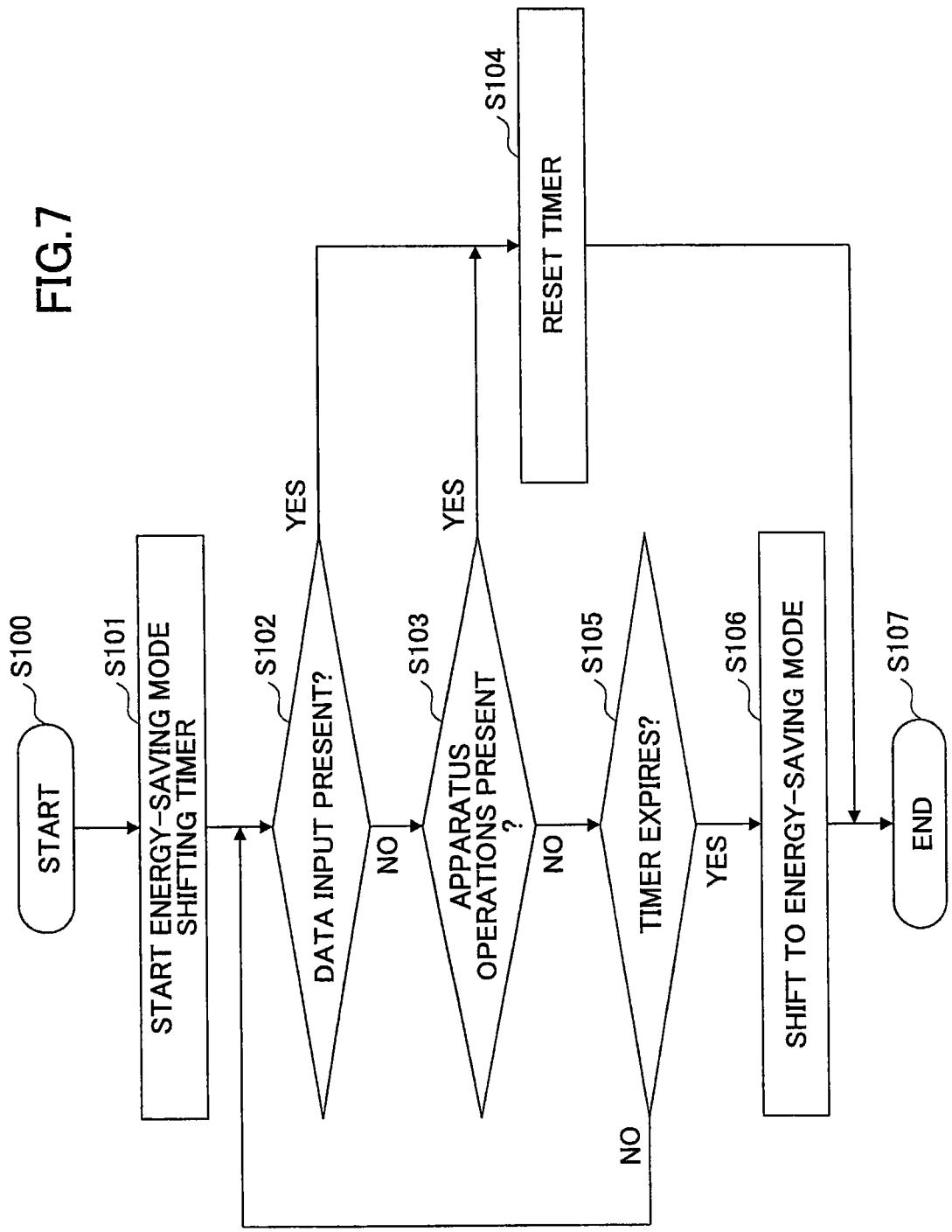
FIG. 7 is a flowchart illustrating a process in which an electric energy mode is shifted from a normal mode to an energy-saving mode in the first embodiment.

FIG. 7 is a flowchart illustrating an example of a sequential order of a process in which the image projection apparatus 1 switches the power state to the energy-saving mode.

The image projection apparatus 1 starts a process to switch the power state to the energy-saving mode after setting the energy-saving mode shifting timer (step S100).

The energy-saving mode shifting time manager 103 starts the set energy-saving mode shifting timer (step S101). The data input detector 104 determines whether there are data input into the image projection apparatus 1 (step S102). In this step, when data input is detected by the data input detector 104 (YES in step S102), the set timer is reset to end the process (steps S104 and S107).

When data input is not detected by the data input detector 104 (NO in step S102), whether there are operations being performed by the user is determined (step S103). In this step, when the user's operations are detected (YES in step S103), the set timer is reset to end the process (steps S104 and S107), similar to the process in step S102. When no user's operations are detected (NO in step S103), whether the set energy-saving mode shifting timer has expired is determined (step S105). When the set energy-saving mode shifting timer has not expired (NO in step S105), the process returns to step S102, and steps S102 to S104 are repeated until the timer expires.

When the set energy-saving mode shifting timer has expired (YES in step S105), the power state shifting determination part 102 sends a request to the power controller 101 to shift the power state to the energy-saving mode, and the power controller 101 shifts the power state to the energy-saving mode (step S106). The process ends after shifting to the energy-saving mode has been completed (step S107).

Figure 8:
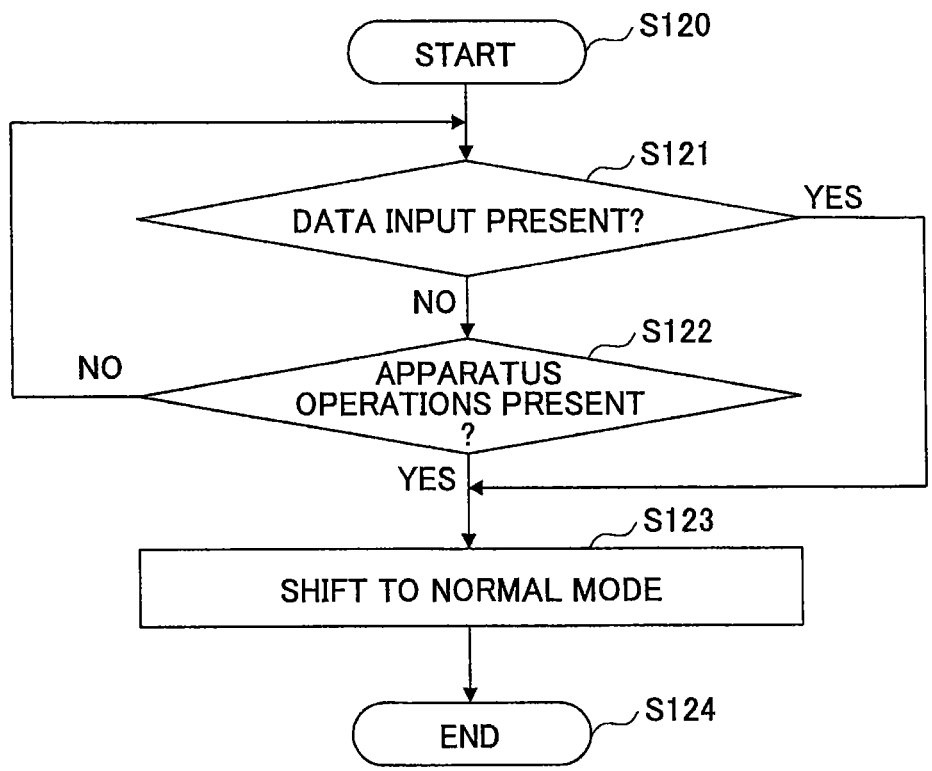
FIG. 8 is a flowchart illustrating a process in which an electric energy mode is shifted from a normal mode to an energy-saving mode in the first embodiment.

FIG. 8 is a flowchart illustrating an example of a sequential order of a process in which the power state of the image projection apparatus 1 is shifted to the energy-saving mode.

The process of FIG. 8 starts after the power controller 101 completes shifting the power state to the energy-saving mode (step S120). The power state shifting determination part 102 determines whether the data input detector 104 has detected data input (step S121). In this step, when the data input detector 104 has detected data input (YES in step S121), the power state shifting determination part 102 sends an instruction to the power controller 101 to shift the energy-saving mode to a normal mode, and the power controller 101 shifts the energy-saving mode to the normal mode (step S123). The process of FIG. 8 ends after the power controller 101 completes shifting the power state (i.e., the energy-saving mode) to the normal mode (step S124).

When the data input detector 104 has not detected data input (NO in step S121), the power state shifting determination part 102 determines whether the apparatus operations detector 105 has detected user's operations (step S122). In this step, when the apparatus operations detector 105 has not detected user's operations (NO in step S122), the power state shifting determination part 102 returns to step S121, and repeats the processes from step S121.

When the apparatus operations detector 105 has detected user's operations (YES in step S123), the power state shifting determination part 102 sends an instruction to the power controller 101 to shift the energy-saving mode to the normal mode, and the power controller 101 shifts the energy-saving mode to the normal mode (step S123). The process of FIG. 8 ends after the power controller 101 completes shifting the power state (i.e., the energy-saving mode) to the normal mode (step S124).

First modification of first embodiment illustrates an example of determining whether the power state of the image projection apparatus 1 is shifted to the energy-saving mode based on information indicating whether there is a communication apparatus capable of operating the image projection apparatus 1 over the network in addition to the information about whether the image projection apparatus 1 is in the communication capable status.

Figure 9:
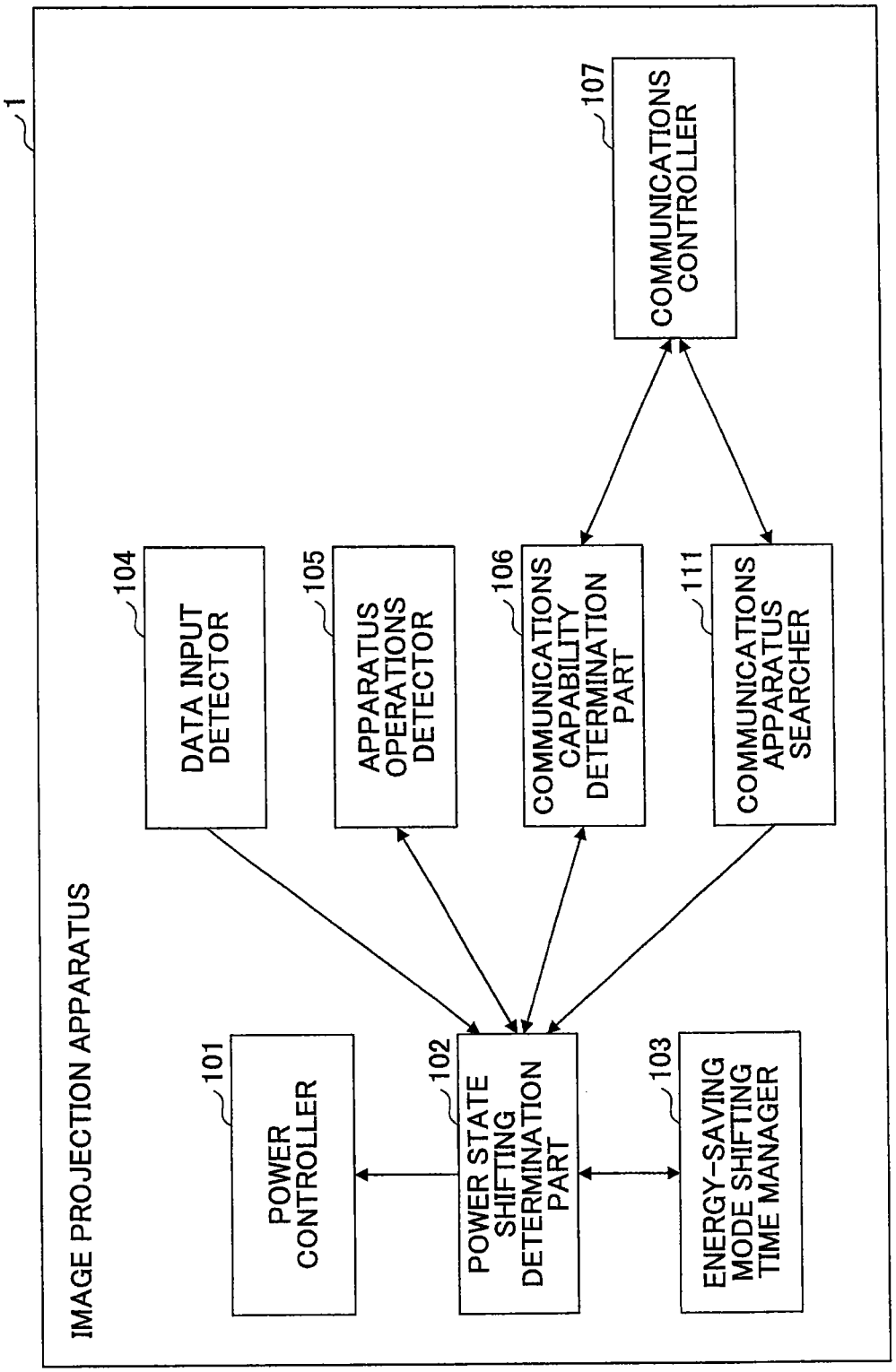
FIG. 9 is a block diagram illustrating a functional configuration example of an image projection apparatus according to the first embodiment.

FIG. 9 is a block diagram illustrating a functional configuration example of an image projection apparatus 1 according to a first modification of the first embodiment. In FIG. 9, functional components identical to those of FIG. 4 are provided with the same reference numbers. Hence, an illustration of the functional components identical to those of FIG. 4 is omitted from the specification.

The communications apparatus searcher 111 is configured to detect presence or absence of a communication apparatus capable of operating the image projection apparatus 1 via the network by searching for such a communication apparatus. The search for the communication apparatus(es) is conducted by using a communication protocol for use in the management of communication apparatuses within the network, such as a simple service discovery protocol (SSDP), or a simple network management protocol (SNMP). The search for the communication apparatuses may be conducted by broadcasting the search request from the image projection apparatus 1 and waiting for responses from other communication apparatuses. Alternatively, the search for the communication apparatus(es) may be conducted by receiving the search request by the image projection apparatus 1 itself from other communication apparatuses such as a network management apparatus, and causing the image projection apparatus 1 to send a response to the search request to other communication apparatuses. Further, the search for the communication apparatuses may be conducted by receiving a status change from other communication apparatuses.

The power state shifting determination part 102 determines the time required for shifting to the energy-saving mode in accordance with the information indicating whether the image projection apparatus 1 is in the communication capable status, and the information indicating whether the communication apparatus capable of operating the image projection apparatus 1 is present. For example, when the image projection apparatus 1 is in the communication capable status, and the communication apparatus capable of operating the image projection apparatus 1 is present over the network, the power state shifting determination part 102 sets the time required for shifting to the energy-saving mode as within five minutes. When the image projection apparatus 1 is in the communication capable status but the communication apparatus capable of operating the image projection apparatus 1 is not present over the network, and the image projection apparatus 1 is in a communication incapable status, the power state shifting determination part 102 sets the time required for shifting to the energy-saving mode as approximately three minutes.

Note that the value to be set as a time required for shifting to the energy-saving mode may be input via the user's operation on the main body of the image projection apparatus 1. Alternatively, the value to be set as a time required for shifting to the energy-saving mode may be set by receiving the user's operation with a keyboard and a mouse on the information processing apparatus 3. Further, the value to be set as a time required for shifting to the energy-saving mode may be set as an initial value in the image projection apparatus 1.

Note that a data table illustrated in FIG. 10 may be maintained for setting the time required for shifting to the energy-saving mode.

Figure 11:
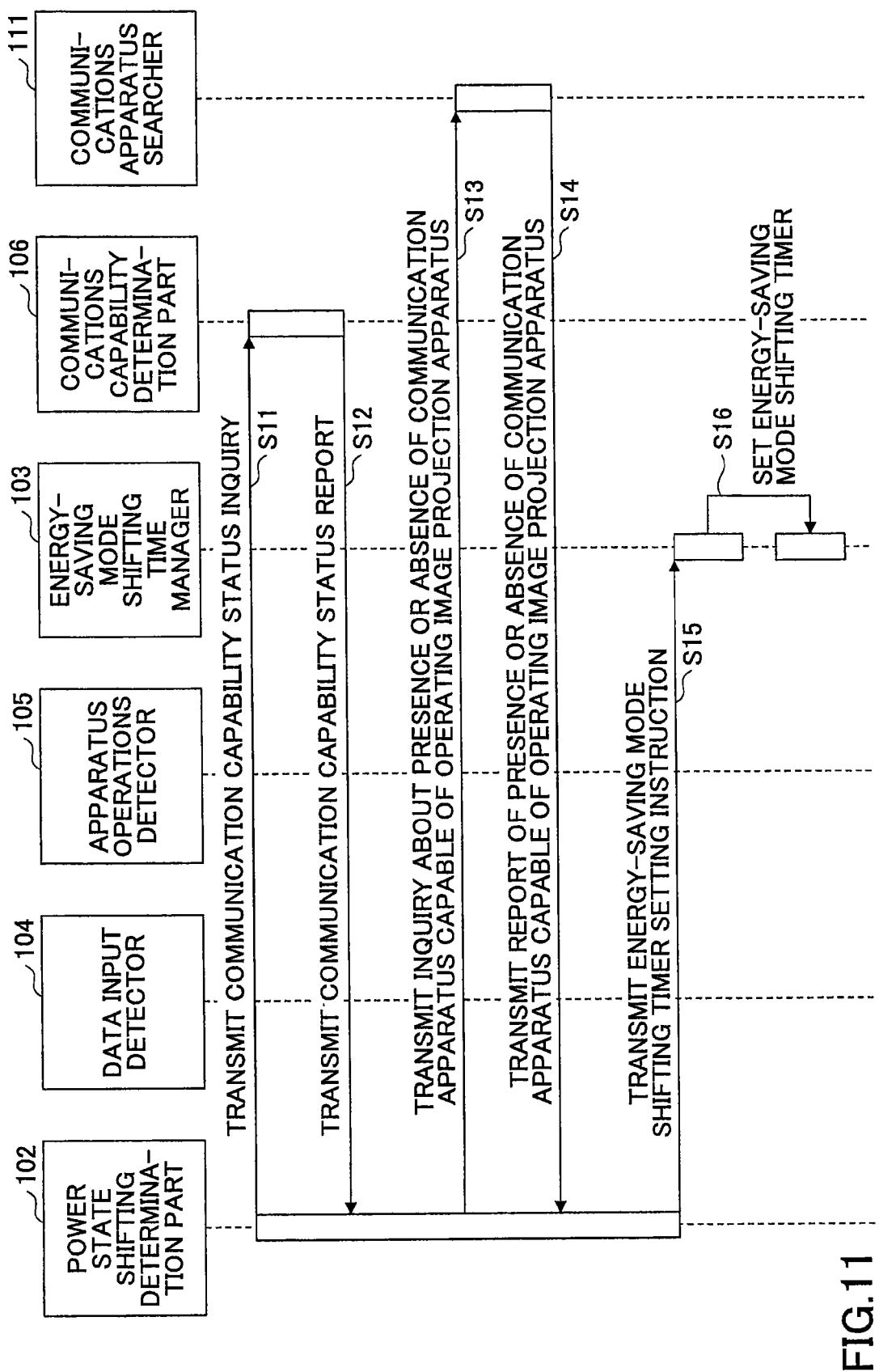
FIG. 11 is a sequence diagram illustrating a flow for setting an energy-saving mode shifting timer in the first modification of the first embodiment.

FIG. 11 is a sequence diagram illustrating a flow for setting an energy-saving mode shifting timer in the image projection apparatus 1 of the first modification of the first embodiment.

The power state shifting determination part 102 determines whether the image projection apparatus 1 is in a communication capable status (steps S11 and S12).

When the image projection apparatus 1 in the communication capable status, the power state shifting determination part 102 sends a request to the communications apparatus searcher 111 to search for any communication apparatuses that are capable of operating the image projection apparatus 1 over the network (step S13). The communications apparatus searcher 111 conducts a search for the communication apparatuses capable of operating the image projection apparatus 1 over the network, and sends a report of a search result back to the power state shifting determination part 102 (step S14).

The power state shifting determination part 102 determines the time required for shifting to the energy-saving mode in accordance with the information indicating whether the image projection apparatus 1 is in the communication capable status, and the information indicating whether a communication apparatus capable of operating the image projection apparatus 1 is present over the network. The power state shifting determination part 102 sends an instruction to the energy-saving mode shifting time manager 103 to set the time required for shifting to the energy-saving mode as an energy-saving mode shifting timer (step S15). The energy-saving mode shifting time manager 103 sets the time required for shifting to the energy-saving mode as the energy-saving mode shifting timer (step S16).

The sequential order of the process of the image projection apparatus 1 of the first modification of the first embodiment to switch the power state to the energy-saving mode is identical to that illustrated in FIG. 7, and a duplicated description is thus omitted from the specification.

The sequential order of the process of the image projection apparatus 1 of the first modification of the first embodiment to switch the power state from the energy-saving mode to the normal mode is identical to that illustrated in FIG. 8, and a duplicated description is thus omitted from the specification.

Second Modification of First Embodiment

In a second modification of the first embodiment, whether to shift to the energy-saving mode is determined based on the information indicating whether data requesting a process that is unexecutable in the energy-saving mode (hereinafter called "data requesting the unexecutable process in the energy-saving mode") has been received within a predetermined period in place of the information indicating whether the image projection apparatus 1 is in the communication capable status.

Figure 12:
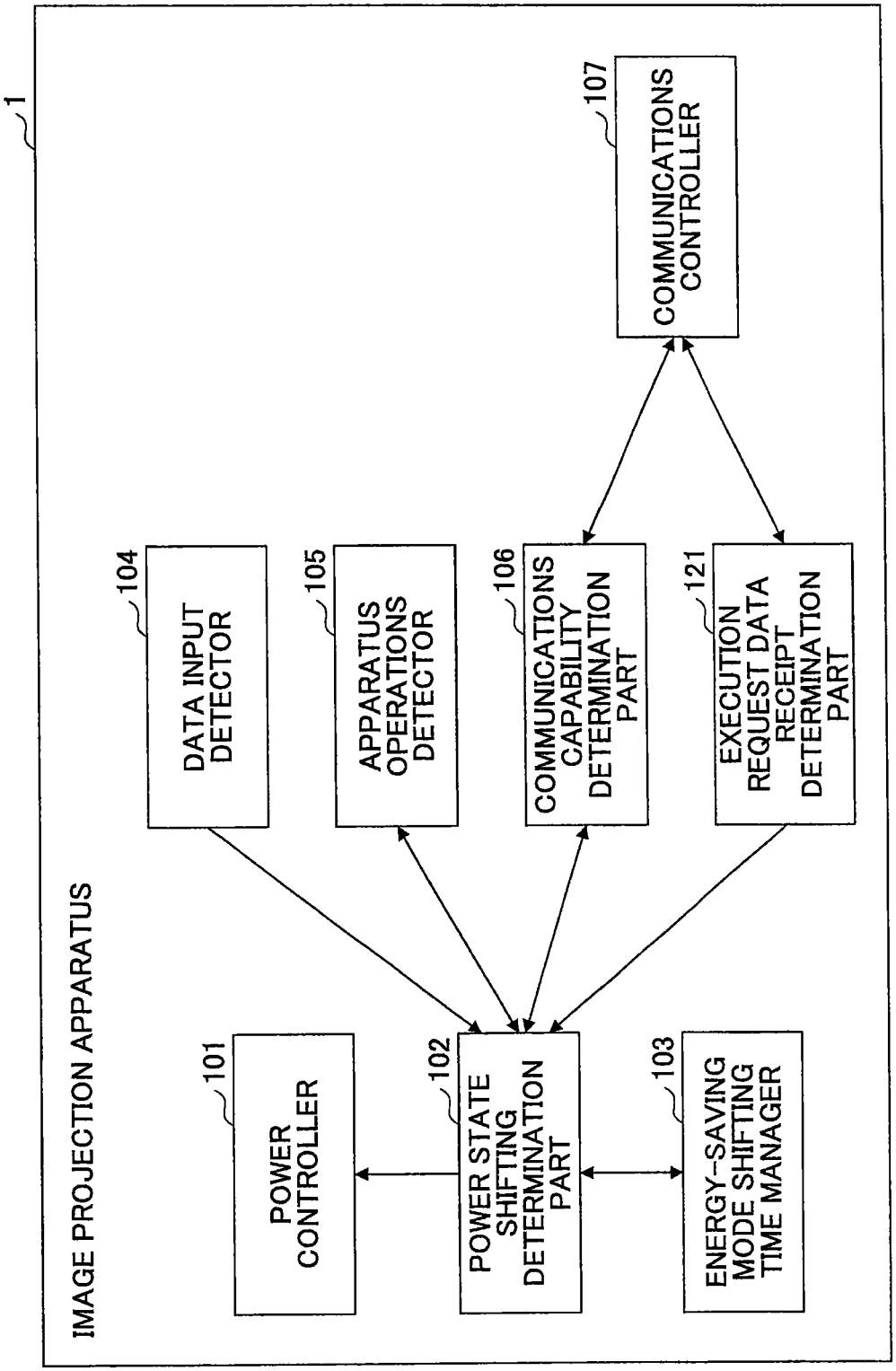
FIG. 12 is a block diagram illustrating a functional configuration example of an image projection apparatus according to a second modification of the first embodiment.

FIG. 12 is a block diagram illustrating a functional configuration example of an image projection apparatus 1 according to a first modification of the first embodiment. In FIG. 12, functional components identical to those of FIG. 4 are provided with the same reference numbers. Hence, an illustration of the functional components identical to those of FIG. 4 is omitted from the specification.

The execution request data receipt determination part 121 determines whether data requesting the unexecutable process in the energy-saving mode has been received within the predetermined period. The execution request data receipt determination part 121 sends a report of the determination result to the power state shifting determination part 102. Examples of the unexecutable process in the energy-saving mode include remote-controller's operations (operating up, down, left, and right keys, a menu key, an enter key, etc.), and a volume change operation. Further, the period in which the execution request data receipt determination part 121 detects whether data requesting the unexecutable process in the energy-saving mode has been received may be entered by the user's operation, or may be determined by setting an initial value of a detecting period in the image projection apparatus 1.

The power state shifting determination part 102 determines the time required for shifting to the energy-saving mode in accordance with the information indicating whether the image projection apparatus 1 is in the communication capable status, and information indicating whether data requesting the unexecutable process in the energy-saving mode has been received within the predetermined period. For example, when the image projection apparatus 1 is in the communication capable status, and data requesting the unexecutable process in the energy-saving mode has been received within the predetermined period, 5 minutes is set as a timer for the energy-saving mode. When the image projection apparatus 1 is in the communication capable status, but data requesting the unexecutable process in the energy-saving mode has not been received within the predetermined period, 3 minutes is set as the timer for the energy-saving mode. Likewise, when the image projection apparatus 1 is in a communication incapable status, 3 minutes is set to the timer for the energy-saving mode.

Note that the value to be set as the time required for shifting to the energy-saving mode may be input via the user's operation on the main body of the image projection apparatus 1. Alternatively, the value to be set as the time required for shifting to the energy-saving mode may be set by receiving the user's operation with a keyboard and a mouse on the information processing apparatus 3. Further, the value to be set as a time required for shifting to the energy-saving mode may be set as an initial value in the image projection apparatus 1.

Note that a data table illustrated in FIG. 13 may be maintained for setting the time required for shifting to the energy-saving mode.

Figure 14:
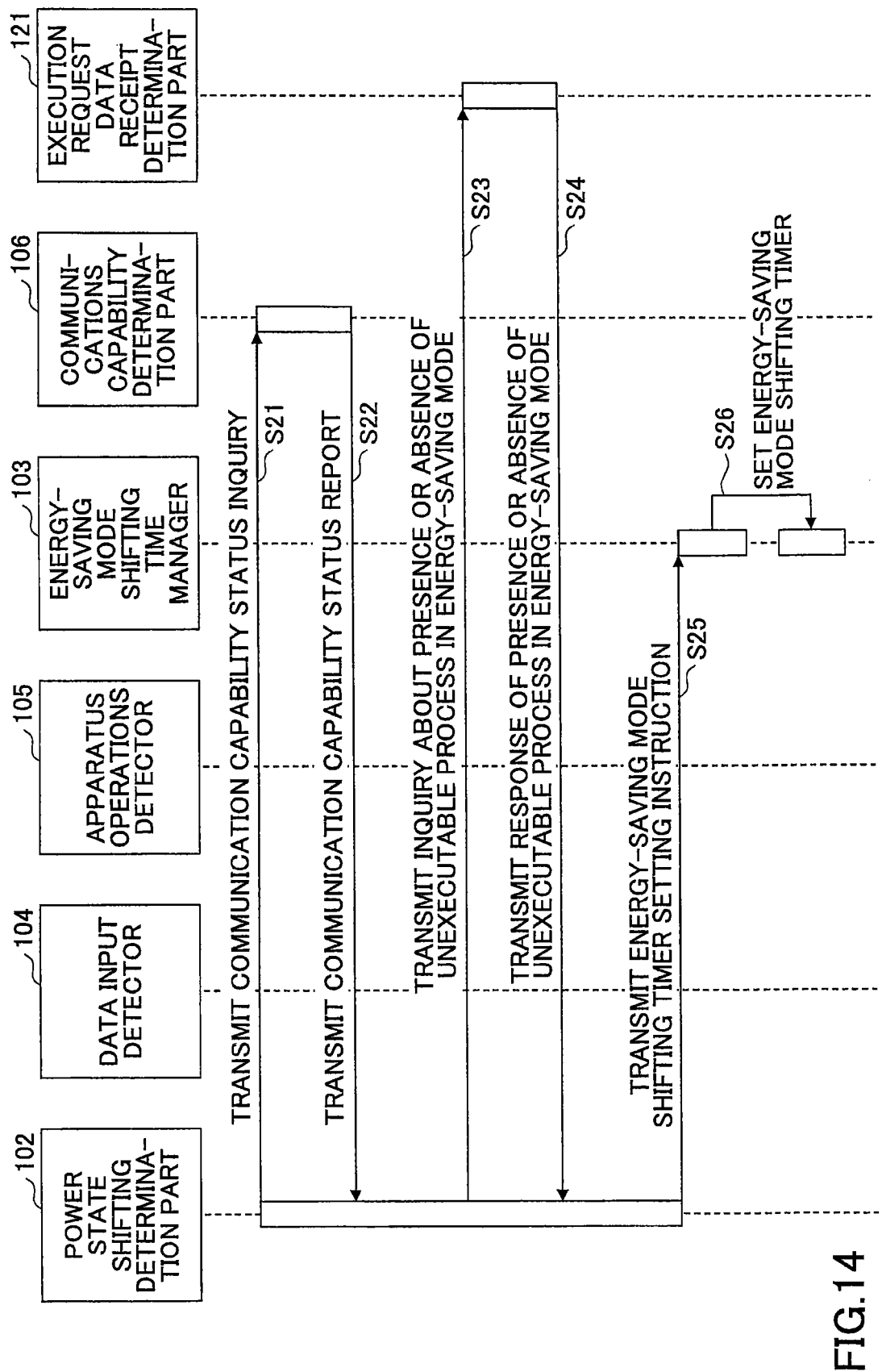
FIG. 14 is a sequence diagram illustrating a flow for setting an energy-saving mode shifting timer in the second modification of the first embodiment.

FIG. 14 is a sequence diagram illustrating a flow for setting an energy-saving mode shifting timer in the image projection apparatus 1 of the second modification of the first embodiment.

The power state shifting determination part 102 determines whether the image projection apparatus 1 is in the communication capable state (steps S21 and S22).

The power state shifting determination part 102 sends to the execution request data receipt determination part 121 an inquiry about whether data requesting the unexecutable process in the energy-saving mode has been received within the predetermined period (step S23). The execution request data receipt determination part 121 sends to the power state shifting determination part 102 a report of whether the unexecutable process in the energy-saving mode has been received within the predetermined period (step S24).

The power state shifting determination part 102 determines the timer required for shifting to the energy-saving mode in accordance with the report received from the execution request data receipt determination part 121. The power state shifting determination part 102 sends a request to the energy-saving mode shifting time manager 103 to set the time required for shifting to the energy-saving mode as an energy-saving mode shifting timer (step S25). The energy-saving mode shifting time manager 103 sets the time required for shifting to the energy-saving mode as the energy-saving mode shifting timer (step S26).

The sequential order of the process of the image projection apparatus 1 of the second modification of the first embodiment to switch the power state to the energy-saving mode is identical to that illustrated in FIG. 7, and a duplicated description is thus omitted from the specification.

The sequential order of the process of the image projection apparatus 1 of the second modification of the first embodiment to switch the power state from the energy-saving mode to the normal mode is identical to that illustrated in FIG. 8, and a duplicated description is thus omitted from the specification.

Third Modification of First Embodiment

In a third modification of the first embodiment, an operation example of shifting to the energy-saving mode by setting the time required for shifting to the energy-saving mode in accordance with information indicating a process status of the unexecutable process in the energy-saving mode in addition to the information indicating whether the image projection apparatus 1 is in the communication capable status.

FIG. 15 is a block diagram illustrating a functional configuration example of an image projection apparatus 1 according to the third modification of the first embodiment. In FIG. 15, functional components identical to those of FIG. 4 are provided with the same reference numbers. Hence, an illustration of the functional components identical to those of FIG. 4 is omitted from the specification.

The process determination part 131 determines a process status indicating whether a process unexecutable in the energy-saving mode is in execution or whether the process unexecutable in the energy-saving mode has been scheduled for execution. Note that when the process determination part 131 determines a process status indicating the process that is unexecutable in the energy-saving mode and is scheduled for execution, it is preferable that the process determination part 131 determine when such a process is executed. Examples of the unexecutable process in the energy-saving mode include remote-controller's operations (operating up, down, left, and right keys, a menu key, an enter key, etc.), and a volume change operation on the image projection apparatus 1 via a data transmission channel or a network. Examples of the unexecutable process in the energy-saving mode that may be subscribed include a process of regularly sending a report of a status of the image projection apparatus 1 to a manager apparatus via the network.

The power state shifting determination part 102 determines the time required for shifting to the energy-saving mode in accordance with information associated with a process status of the unexecutable process in the energy-saving mode and information indicating whether the image projection apparatus 1 is in the communication capable status. For example, when the unexecutable process in the energy-saving mode is in execution, the time required for shifting to the energy-saving mode is not set regardless of whether the image projection apparatus 1 is in the communication capable status. When the unexecutable process in the energy-saving mode is not in execution and the image projection apparatus 1 is in the communication capable status, 5 minutes is set. When the unexecutable process in the energy-saving mode is not in execution and the image projection apparatus 1 is in the communication incapable status, 3 minutes is set. Further, the time required for shifting to the energy-saving mode may be set at a timing when the unexecutable process in the energy-saving mode that is in execution ends.

The time required for shifting to the energy-saving mode when there is an unexecutable process that is scheduled for execution may be determined based on when the subscribed unexecutable process in the energy-saving mode is to be executed. For example, a threshold of the time required for starting the subscribed unexecutable process in the energy-saving mode may be 5 minutes and when the subscribed unexecutable process in the energy-saving mode is to be executed within 5 minutes, a timer is unset. When the subscribed unexecutable process in the energy-saving mode is to be executed after 5 minutes, 3 minutes may be set in the timer.

Note that the value to be set as the time required for shifting to the energy-saving mode may be input via the user's operation on the main body of the image projection apparatus 1. Alternatively, the value to be set as the time required for shifting to the energy-saving mode may be set by receiving the user's operation with a keyboard and a mouse on the information processing apparatus 3. Further, the value to be set as the time required for shifting to the energy-saving mode may be set as an initial value in the image projection apparatus 1.

Note that a data table illustrated in FIGS. 16 and 17 may be maintained for setting the time required for shifting to the energy-saving mode.

Figure 18:
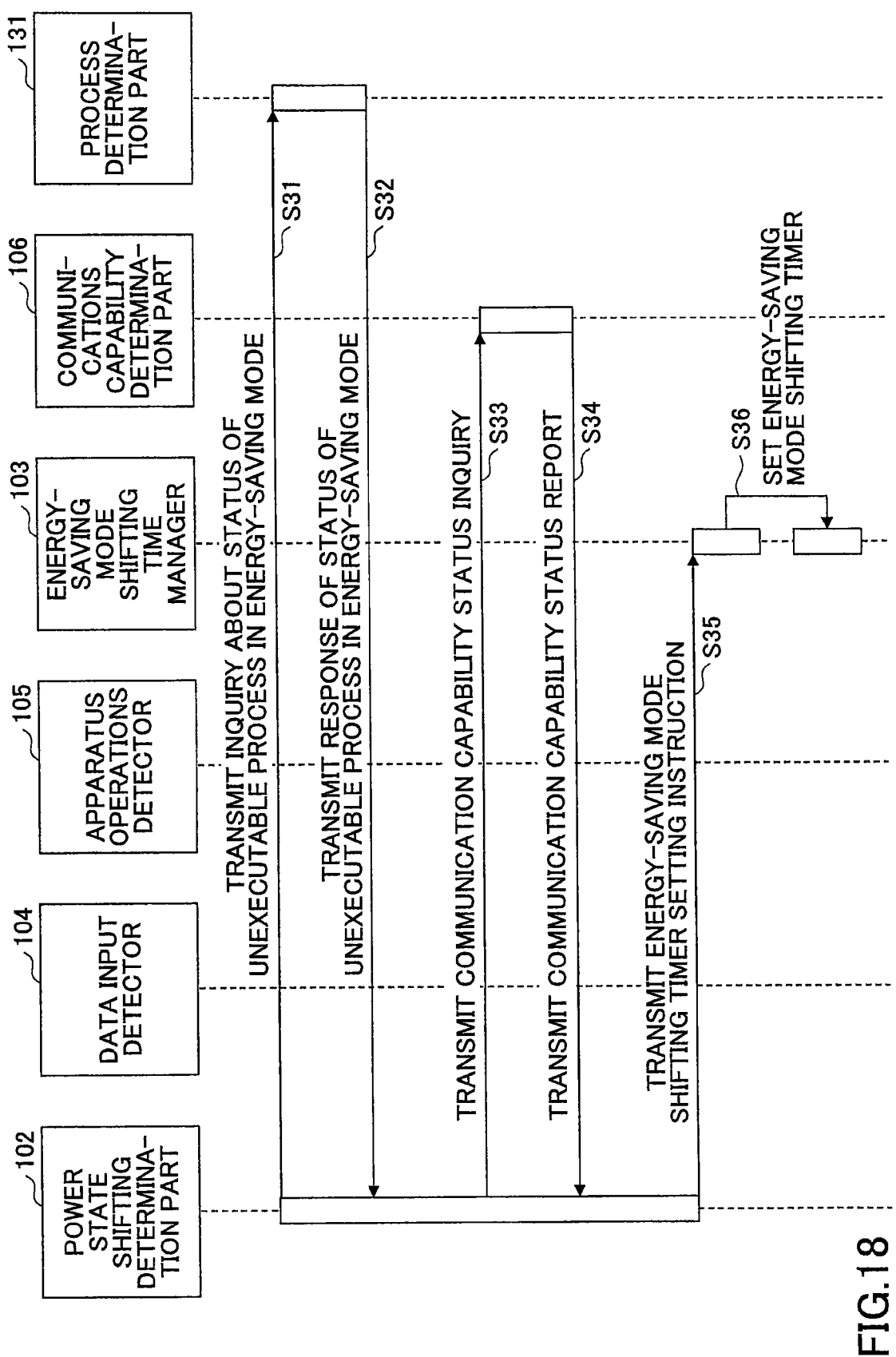
FIG. 18 is a sequence diagram illustrating a flow for setting an energy-saving mode shifting timer in the third modification of the first embodiment.

FIG. 18 is a sequence diagram illustrating a flow for setting an energy-saving mode shifting timer in the image projection apparatus 1 of the third modification of the first embodiment. The process of the flow before shifting to the energy-saving mode is illustrated with reference to FIG. 18; however, a description identical to that of FIG. 5 is omitted from the specification. The image projection apparatus 1 starts a process of setting the time required for shifting to the energy-saving mode when neither data input nor user's operation are being performed with respect to the image projection apparatus 1 within a predetermined period.

The power state shifting determination part 102 sends to the process determination part 131 an inquiry about whether the unexecutable process in the energy-saving mode is currently in execution or whether the unexecutable process in the energy-saving mode has been scheduled for execution (step S31). The process determination part 131 sends to the power state shifting determination part 102 a report of whether the unexecutable process in the energy-saving mode is currently in execution or whether the unexecutable process in the energy-saving mode has been scheduled for execution (step S32). When the unexecutable process in the energy-saving mode is not currently in execution or the unexecutable process in the energy-saving mode has not been scheduled for execution, the power state shifting determination part 102 sends to the communications capability determination part 106 an inquiry about whether the image projection apparatus 1 is in the communication capable status (step S33). The communications capability determination part 106 sends to the power state shifting determination part 102 a report of whether the image projection apparatus 1 is in the communication capable status (step S34). The power state shifting determination part 102 sends a request to the energy-saving mode shifting time manager 103 to set the time required for shifting to the energy-saving mode as an energy-saving shifting timer (step S35). The energy-saving mode shifting time manager 103 sets the time required for shifting to the energy-saving mode as the energy-saving mode shifting timer (step S36).

Figure 19:
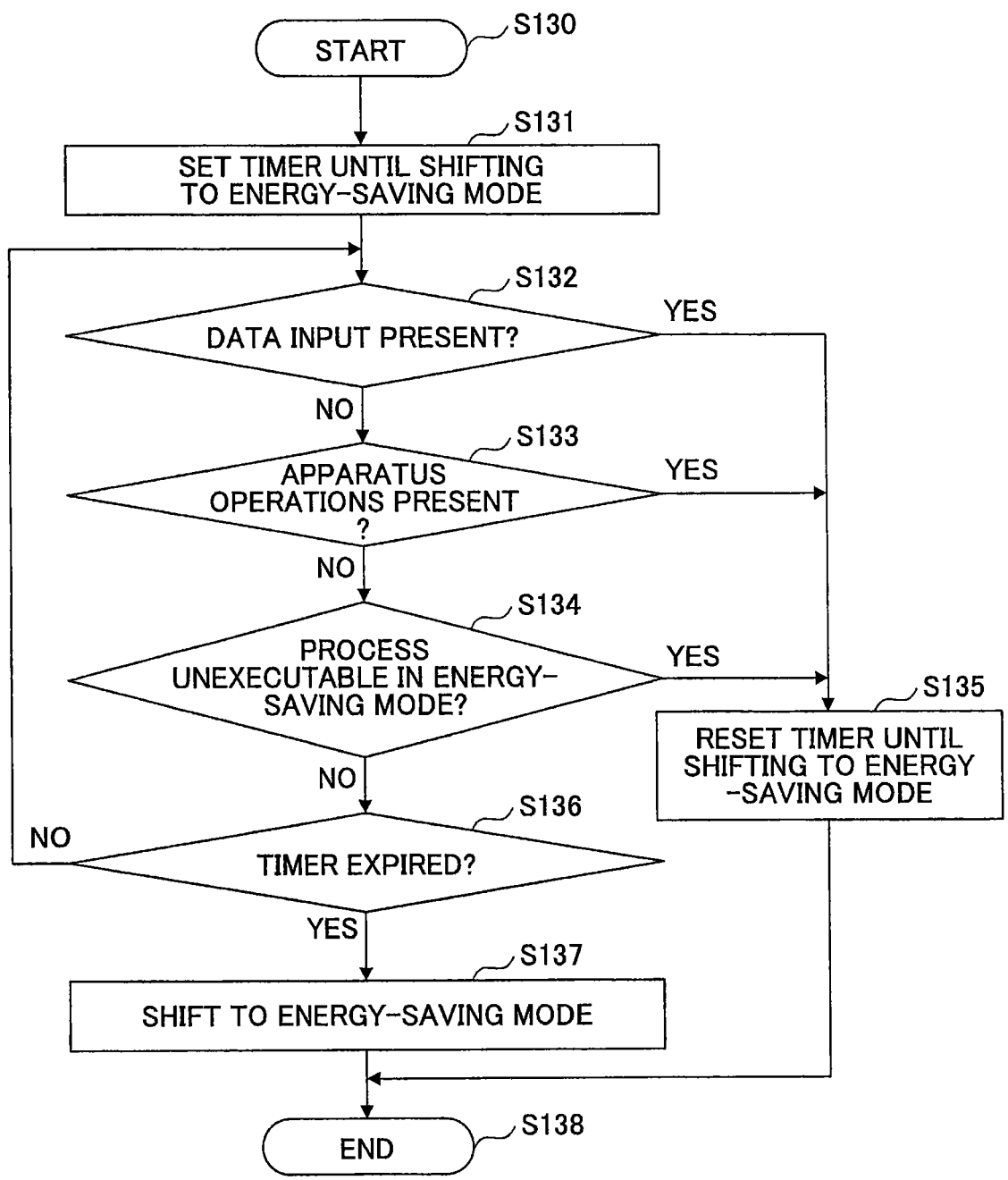
FIG. 19 is a process in which an electric energy mode is shifted from a normal mode to an energy-saving mode in the third modification of the first embodiment.

FIG. 19 is a flowchart illustrating an example of a sequential order of a process in which the image projection apparatus 1 switches the power state to the energy-saving mode in the third modification of the first embodiment.

The image projection apparatus 1 starts a process to switch the power state to the energy-saving mode after setting the energy-saving mode shifting timer (step S130).

The energy-saving mode shifting time manager 103 starts the set energy-saving mode shifting timer (step S131). After the energy-saving mode shifting time manager 103 starts the set energy-saving mode shifting timer, whether there are data input into the image projection apparatus 1 and the user's operation on the image projection apparatus 1 are determined (steps S132 and S133). When there are data input into the image projection apparatus 1 and the user's operation on the image projection apparatus 1, the energy-saving shifting timer is reset to end the process (steps S135 and S138).

When there are no data input into the image projection apparatus 1 and no user's operation on the image projection apparatus 1, whether the process unexecutable in the energy-saving mode has been started is determined (step S134). When the process unexecutable in the energy-saving mode has been started (YES in step S134), the energy-saving shifting timer is reset (step S135) to end the process to shift to the energy-saving mode (step S138). When the process unexecutable in the energy-saving mode has not been started (NO in step S134), whether the energy-saving shifting timer has expired is determined (step S136). When the energy-saving shifting timer has expired (YES in step S136), the power controller 101 shifts the power state to the energy-saving mode (step S137). After shifting the power state to the energy-saving mode has been completed, the process to shift to the energy-saving mode ends (step S138).

Figure 20:
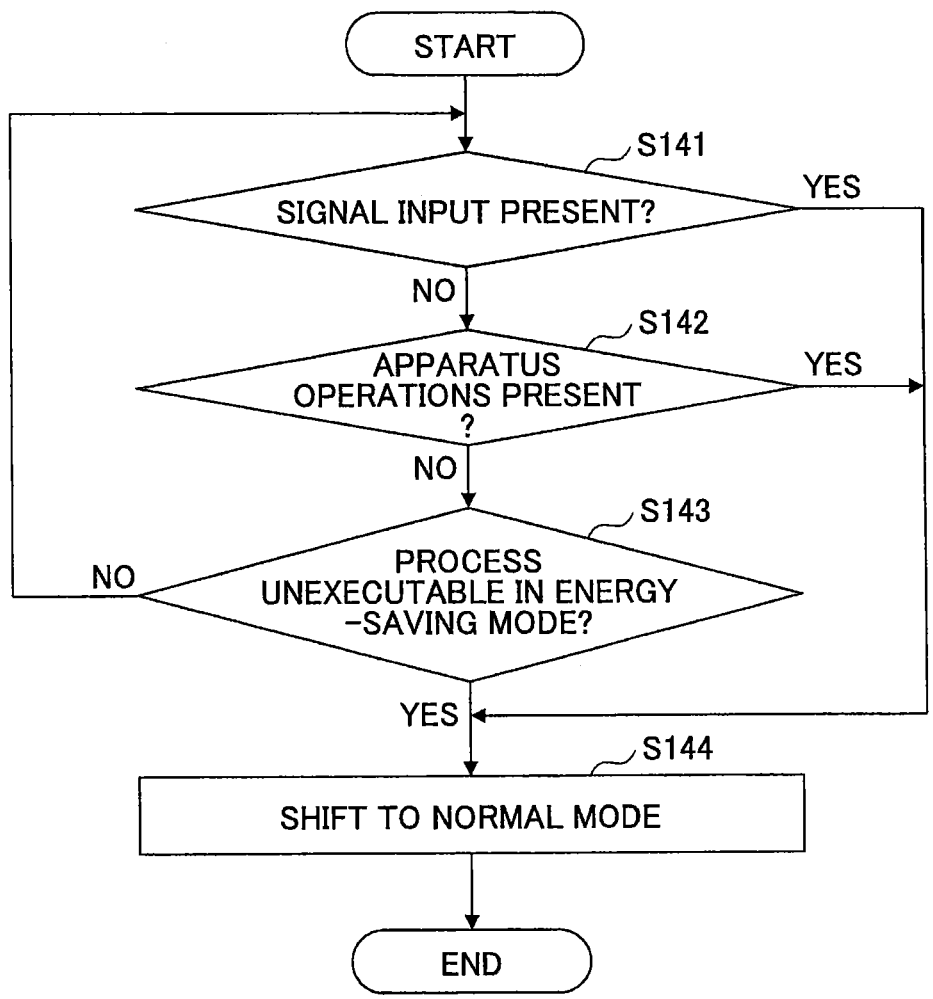
FIG. 20 is a flowchart illustrating a process in which an electric energy mode is shifted from a normal mode to an energy-saving mode in the third modification of the first embodiment.

FIG. 20 is a flowchart illustrating a process executed when the energy-saving mode is switched to the normal mode in the image projection apparatus 1 of the third modification of the first embodiment. Whether data input and the user's operation are present is determined after the power state is shifted to the energy-saving mode (steps S141 and S142). When data input and the user's operation are not present, the process determination part 131 determines whether the process unexecutable in the energy-saving mode has started (step S143). When the process unexecutable in the energy-saving mode has started (YES in step S143), the power state controller 101 executes a process to switch the energy-saving mode to the normal mode (step S144). When the process unexecutable in the energy-saving mode has not been conducted (NO in step S143), steps from S141 to S143 are repeatedly performed.

Second Embodiment

A second embodiment illustrates an example in which a timer for shifting to the energy-saving mode is set in accordance with a remaining lamp usable time in the image projection apparatus 1.

Figures 21, 22:
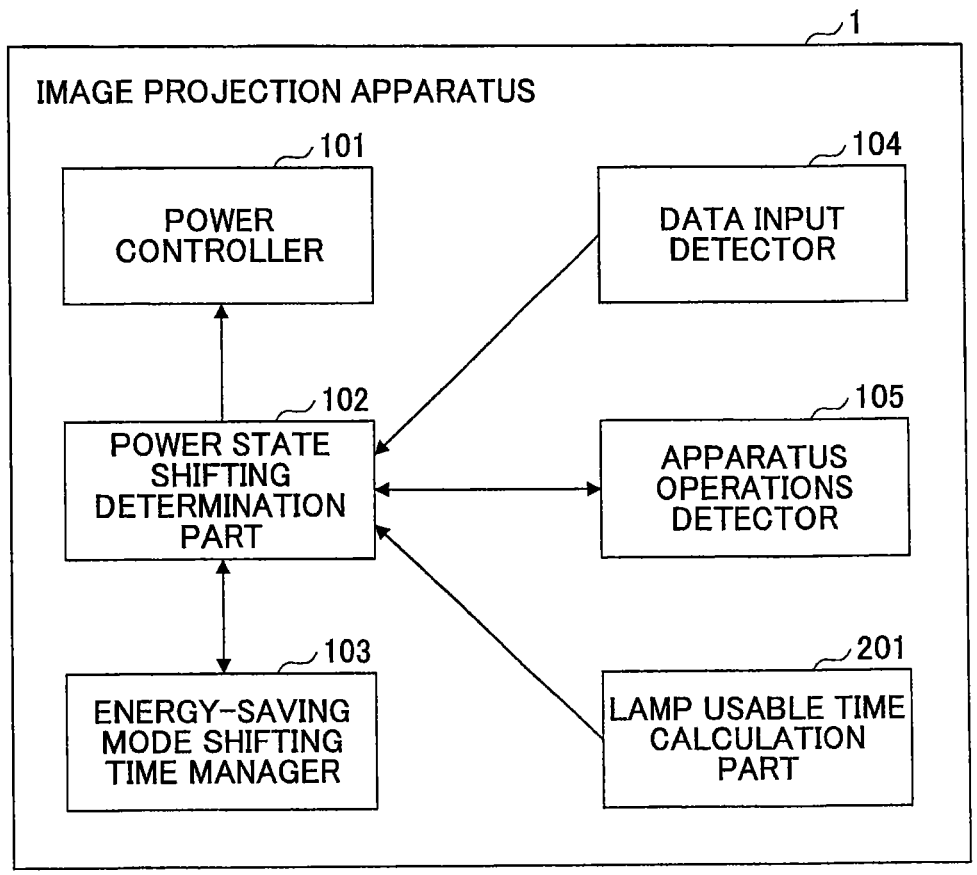
FIG. 21 is a block diagram illustrating a functional configuration example of an image projection apparatus according to a second embodiment.
FIG. 22 is a diagram illustrating a configuration example of data used for setting time required for shifting to an energy-saving mode in the second embodiment.

FIG. 21 is a block diagram illustrating a functional configuration example of an image projection apparatus 1 according to the second embodiment. In FIG. 21, functional components identical to those of FIG. 4 are provided with the same reference numbers. Hence, an illustration of the functional components identical to those of FIG. 4 is omitted from the specification.

A lamp usable time calculation part 201 is configured to calculate a remaining lamp usable time based on a maximum usable time indicating the time from start using the lamp to the time of expected failure of the lamp and an accumulated value of a lamp usage time. The remaining lamp usable time is calculated by subtracting the accumulated value of the usage time from the maximum usable time. The lamp usable time calculation part 201 sends a report of the calculated remaining lamp usable time to the power state shifting determination part 102.

The power state shifting determination part 102 determines the time required for shifting to the energy-saving mode in accordance with the report of the remaining lamp usable time sent from the lamp usable time calculation part 201. For example, when 100 hours is set as a threshold of the remaining lamp usable time, and the remaining lamp usable time is 100 hours or less, 3 minutes may be set as the time required for shifting to the energy-saving mode. On the other hand, when the remaining lamp usable time exceeds 100 hours, 5 minutes may be set as the time required for shifting to the energy-saving mode.

Note that the value to be set as the time required for shifting to the energy-saving mode may be input via the user's operations on the main body of the image projection apparatus 1. Alternatively, the value to be set as the time required for shifting to the energy-saving mode may be set by receiving the user's operation with a keyboard and a mouse on the information processing apparatus 3. Further, the value to be set as the time required for shifting to the energy-saving mode may be set as an initial value in the image projection apparatus 1.

Note that a data table illustrated in FIG. 22 may be maintained for setting the time required for shifting to the energy-saving mode.

Figure 23:
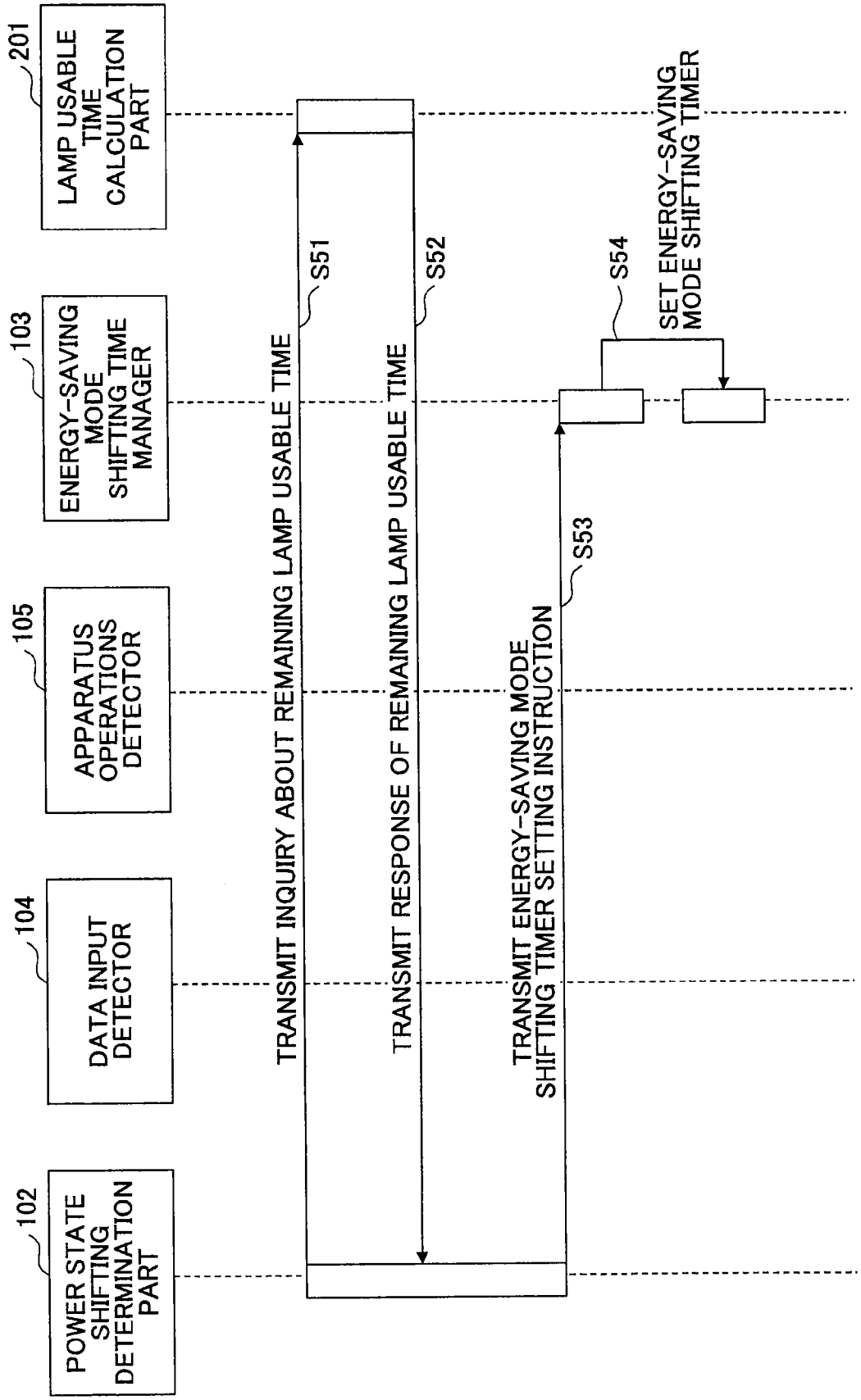
FIG. 23 is a sequence diagram illustrating a flow for setting an energy mode shifting timer in the second embodiment.

FIG. 23 is a sequence diagram illustrating a flow in which the image projection apparatus 1 in the second embodiment sets the energy mode shifting timer.

The power state shifting determination part 102 sends to the lamp usable time calculation part 201 an inquiry about the remaining lamp usable time (step S51). The lamp usable time calculation part 201 calculates the remaining lamp usage time, and sends a report of the calculated remaining lamp usage time to the power state shifting determination part 102 (step S52). The power state shifting determination part 102 determines the time required for shifting to the energy-saving mode in accordance with the calculated remaining lamp usage time, and sends a request to the energy-saving mode shifting time manager 103 to set the determined time as the energy-saving mode shifting timer (step S53). The energy-saving mode shifting time manager 103 sets the time required for shifting to the energy-saving mode as the energy-saving mode shifting timer (step S54).

The sequential order of the process of the image projection apparatus 1 of the second embodiment to switch the power state to the energy-saving mode is identical to that illustrated in FIG. 7, and a duplicated description is thus omitted from the specification.

The sequential order of the process of the image projection apparatus 1 of the second embodiment to switch the power state from the energy-saving mode to the normal mode is identical to that illustrated in FIG. 8, and a duplicated description is thus omitted from the specification.

Third Embodiment

A third embodiment illustrates an operation example of shifting to the energy-saving mode by counting the number of unexecutable processes in the energy-saving mode every predetermined time span and setting the time required for shifting to the energy-saving mode in accordance with a result of the counted number of unexecutable processes in the energy-saving mode.

Figures 24, 25:
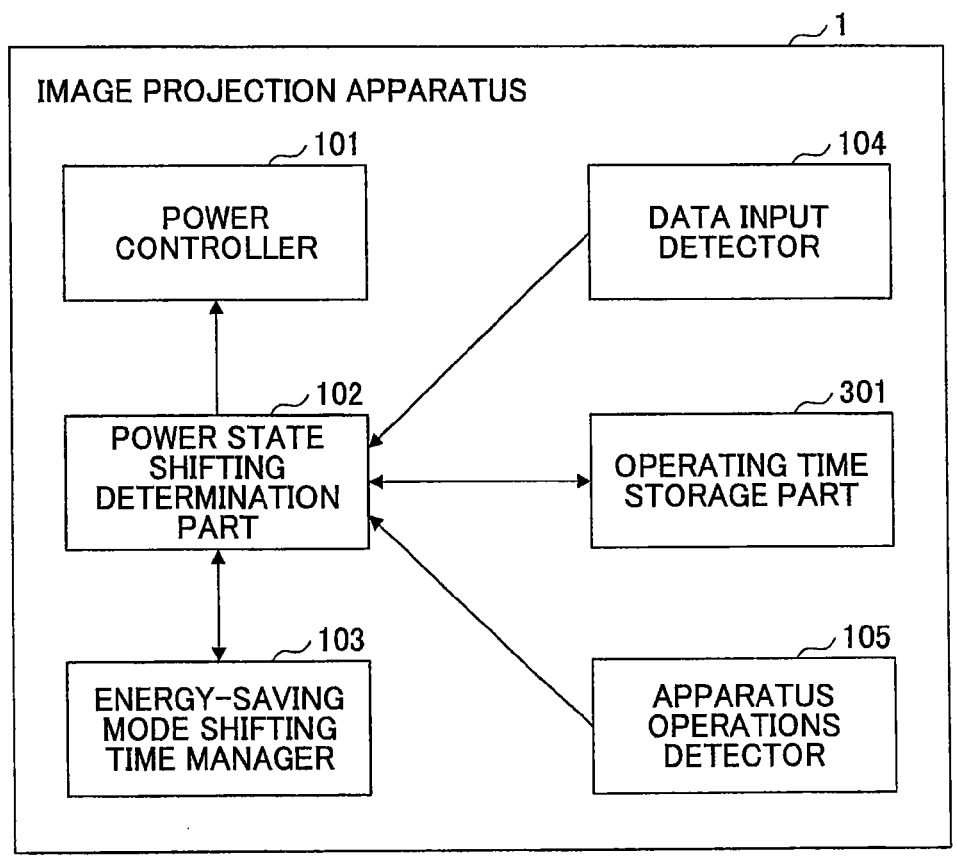
FIG. 24 is a block diagram illustrating a functional configuration example of an image projection apparatus according to a third embodiment.
FIG. 25 is a diagram illustrating a configuration example of data used for setting time required for shifting to an energy-saving mode in the third embodiment.

FIG. 24 is a block diagram illustrating a functional configuration example of an image projection apparatus 1 according to the third embodiment. In FIG. 24, functional components identical to those of FIG. 4 are provided with the same reference numbers. Hence, an illustration of the functional components identical to those of FIG. 4 is omitted from the specification.

The execution time storage part 301 is configured to count the number of unexecutable processes in the energy-saving mode of the image projection apparatus 1 every predetermined time span. For example, the execution time storage part 301 divides a time by the hour, and counts the number of unexecutable processes in the energy-saving mode for each hour in a week. The execution time storage part 301 sends to the power state shifting determination part 102 a report of the counted number of unexecutable processes in the energy-saving mode in a desired hour (i.e., a desired time span) specified by the power state shifting determination part 102.

The power state shifting determination part 102 determines the time required for shifting to the energy-saving mode in accordance with information indicating the number of unexecutable processes in the energy-saving mode every predetermined time span. For example, when a process to determine the time required for shifting to the energy-saving mode is performed in a time span of 14:00 to 15:00, and the number of unexecutable processes having occurred in the energy-saving mode is one or more in the time span of 14:00 to 15:00 over the past one week, 5 minutes may be set as the time required for shifting to the energy-saving mode. On the other hand, when no unexecutable process has occurred in the time span of 14:00 to 15:00 over the past one week, 3 minutes may be set as the time required for shifting to the energy-saving mode.

Note that the value to be set as the time required for shifting to the energy-saving mode may be input via the user's operations on the main body of the image projection apparatus 1. Alternatively, the value to be set as the time required for shifting to the energy-saving mode may be set by receiving the user's operation with a keyboard and a mouse on the information processing apparatus 3. Further, the value to be set as the time required for shifting to the energy-saving mode may be set as an initial value in the image projection apparatus 1.

Note that a data table illustrated in FIG. 25 may be maintained for setting the time required for shifting to the energy-saving mode.

Figure 26:
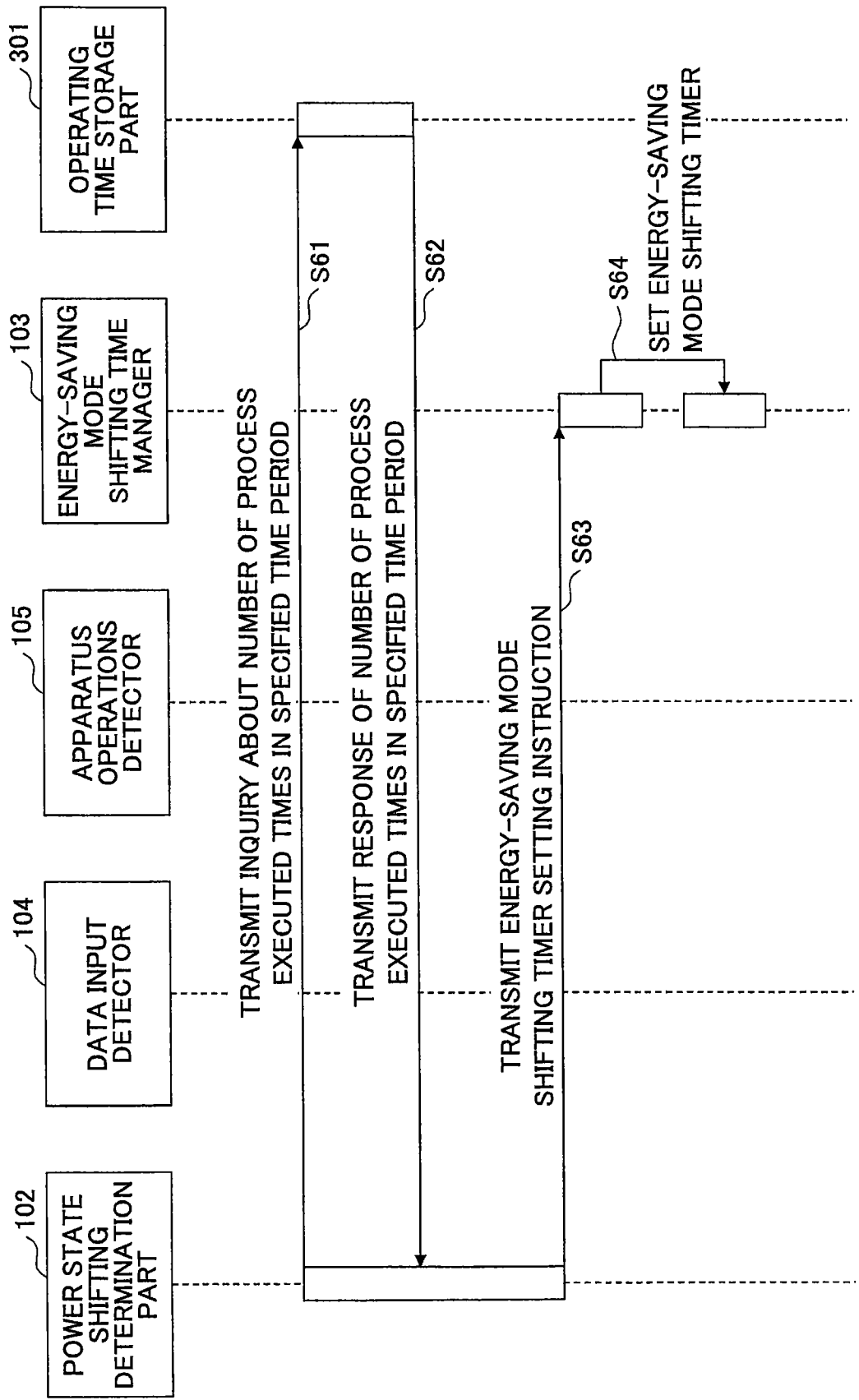
FIG. 26 is a sequence diagram illustrating a flow for setting an energy mode shifting timer in the third embodiment.

FIG. 26 is a sequence diagram illustrating a flow in which the image projection apparatus 1 in the third embodiment sets the energy mode shifting timer.

The power state shifting determination part 102 specifies a desired time span, and sends to the execution time storage part 301 an inquiry about the number of unexecutable processes occurring in the energy-saving mode (step S61). The execution time storage part 301 sends to the power state shifting determination part 102 a report of the number of unexecutable processes occurring in the energy-saving mode in the specified time span (step S62). The power state shifting determination part 102 determines the time required for shifting to the energy-saving mode in accordance with a result of the counted number of unexecutable processes occurring in the energy-saving mode obtained by the execution time storage part 301, and sends a request to the energy-saving mode shifting time manager 103 to set the determined time as the energy-saving mode shifting timer (step S63). The energy-saving mode shifting time manager 103 sets the specified time required for shifting to the energy-saving mode as the energy-saving mode shifting timer (step S64).

The sequential order of the process of the image projection apparatus 1 of the third embodiment to switch the power state to the energy-saving mode is identical to that illustrated in FIG. 7, and a duplicated description is thus omitted from the specification.

The sequential order of the process of the image projection apparatus 1 of the third embodiment to switch the power state from the energy-saving mode to the normal mode is identical to that illustrated in FIG. 8, and a duplicated description is thus omitted from the specification.

Fourth Embodiment

A fourth embodiment illustrates an example of shifting the power state to the energy-saving mode by preparing multiple energy-saving modes, and setting the time required for shifting to the energy-saving mode in a destination.

Figures 27, 28:
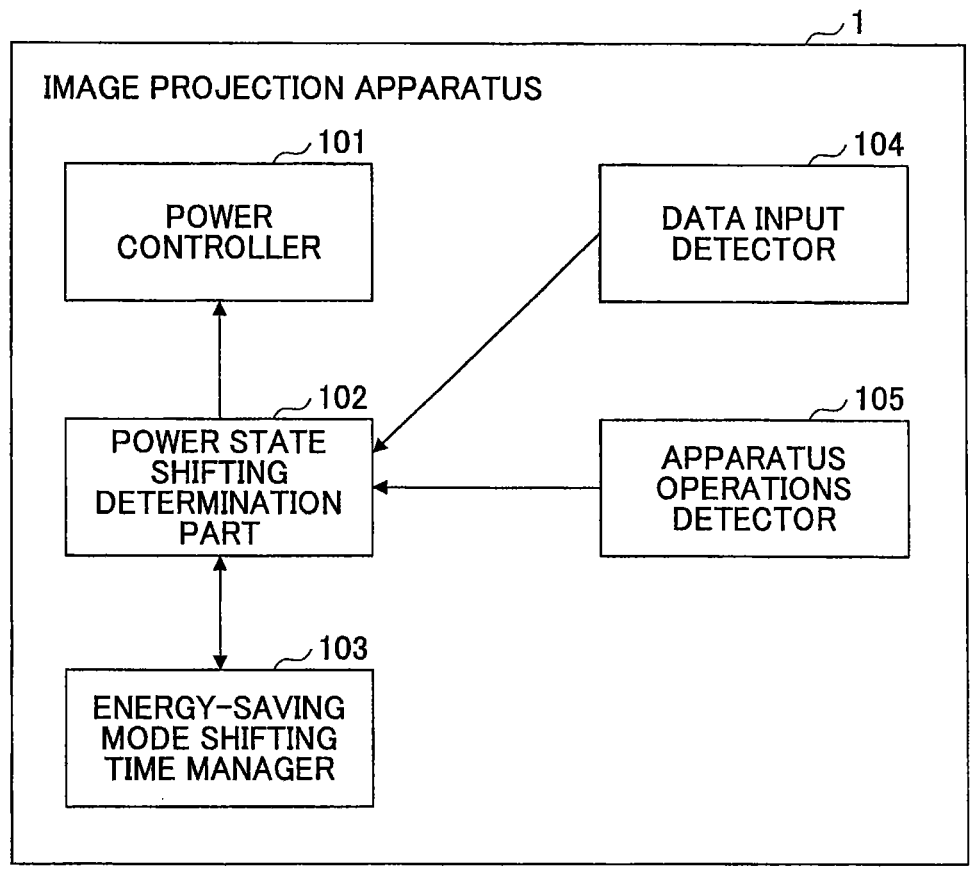
FIG. 27 is a block diagram illustrating a functional configuration example of an image projection apparatus according to a fourth embodiment.
FIG. 28 is a diagram illustrating a configuration example of data used for setting time required for shifting to an energy-saving mode in the fourth embodiment.

FIG. 27 is a block diagram illustrating a functional configuration example of an image projection apparatus 1 according to the fourth embodiment. In FIG. 27, functional components identical to those of FIG. 4 are provided with the same reference numbers. The image projection apparatus 1 starts a process of setting the energy-saving mode shifting timer when neither data input nor user's operation are being performed with respect to the image projection apparatus 1 within a predetermined period.

The power controller 101 includes a different energy-saving mode for each of the functions to be executed waiting in the energy-saving mode. The functions to be executed waiting in the energy-saving mode may have corresponding energy-saving modes for the available communication methods such as wired and wireless communication methods. Specifically, such energy-saving modes include the energy-saving mode for wired and wireless communications, the energy-saving mode for wired communications alone, the energy-saving mode for wireless communications alone, the energy-saving mode without wired and wireless communications, and the like.

The power controller 101 is configured to perform a shifting process of each of the above-described energy-saving modes. In this case, the power controller 101 may determine one of the energy-saving modes by receiving the user's operation. Alternatively, the power controller 101 may automatically determine one of the energy-saving modes in accordance with an operating environment of the image projection apparatus 1. For example, an energy-saving mode capable of using the available communication method may be set as a destination based on the communication method available to the image projection apparatus 1.

The power state shifting determination part 102 sets the timer required for shifting to the energy-saving mode specified as a destination in accordance with an operating environment of the image projection apparatus 1. The power state shifting determination part 102 detects to which one of the energy-saving modes the power state is to be shifted by sending an inquiry to the power controller 101. For example, when the image projection apparatus 1 is in a wireless communication capable status, the timer required for shifting to the energy-saving mode may be set to be a timer a longer time to shift the power state to the power state where wireless communications fail to be performed, and setting a timer to be a short time to shift the power state to the power state where wireless communications are capable of being continued.

Note that the value to be set as the time required for shifting to the energy-saving mode may be input via the user's operations on the main body of the image projection apparatus 1. Alternatively, the value to be set as the time required for shifting to the energy-saving mode may be set by receiving the user's operation with a keyboard and a mouse on the information processing apparatus 3. Further, the value to be set as the time required for shifting to the energy-saving mode may be set as an initial value in the image projection apparatus 1.

Note that a data table illustrated in FIG. 28 may be maintained for setting the time required for shifting to the energy-saving mode.

FIG. 29 is a sequence diagram illustrating a flow in which the image projection apparatus 1 in the fourth embodiment sets the energy mode shifting timer. The process of the flow before shifting to the energy-saving mode is illustrated with reference to FIG. 21; however, a description identical to that of FIG. 5 is omitted from the specification.

The power state shifting determination part 102 sends to the power controller 101 an inquiry about a current power state (step S71). The power state shifting determination part 102 acquires from the power controller 101 information associated with the current power state (step S72). The power state shifting determination part 102 sends to an energy-saving mode shifting time manager 103 an instruction to set the timer required for shifting to the energy-saving mode in accordance with the current power status. The energy-saving mode shifting time manager 103 sets the energy-saving mode shifting timer (step S74).

The sequential order of the process of the image projection apparatus 1 of the fourth embodiment to switch the power state to the energy-saving mode is identical to that illustrated in FIG. 7, and a duplicated description is thus omitted from the specification.

The sequential order of the process of the image projection apparatus 1 of the fourth embodiment to switch the power state from the energy-saving mode to the normal mode is identical to that illustrated in FIG. 8, and a duplicated description is thus omitted from the specification.

The present invention is not limited to the above-described preferred embodiments and modifications. The information processing apparatus 3 connected to the image display apparatus 1 via data transmission or a network may include functions associated with shifting the power state of the image projection apparatus 1. Further, two or more information processing apparatuses 3 may constitute the system. In the preferred embodiments, the image projection apparatus is illustrated as a component of the system. However, the components of the system are not limited to the image projection apparatus, and the components of the system may include an image display apparatus.

In the above embodiments and modifications, the present invention is illustrated with specific examples; however, the present invention is not limited to these examples, and various alterations or changes may be made without departing from the gist and scope of the claims of the present invention. Specifically, the present invention shall not be construed as being limited to details of the specific examples and accompanying drawings thereof.

According to an aspect of the embodiments, it is possible to switch an energy state of the image display apparatus in accordance with a state or an environment of the image display apparatus.

The present invention is not limited to the specifically disclosed embodiments, and variations and modifications may be made without departing from the scope of the present invention.

The present application is based on Japanese Priority Application No. 2014-015273 filed on Jan. 30, 2014, the entire contents of which are hereby incorporated herein by reference.

What is claimed is:

1. An image display apparatus capable of performing communications via a network, the image display apparatus comprising:
    processing circuitry configured to perform:
        shifting an energy state to an energy-saving state in which energy consumption is suppressed;
        setting a time required for shifting to the energy-saving state in accordance with a state or an environment of the image display apparatus;
        detecting a presence or an absence of data input into the image display apparatus; and
        detecting whether an operation on the image display apparatus is being performed by a user,
    wherein when no data input is detected by the detecting of the presence or absence and no operation on the image display apparatus being performed by the user is detected by the detecting of whether an operation on the image display apparatus is being performed by a user, and when the time required for shifting to the energy-saving state set by the setting has elapsed, the shifting shifts the energy state to the energy-saving state in which energy consumption is suppressed,
    the processing circuitry is further configured to perform:
        determining whether the image display apparatus is in a state capable of performing communications,
    wherein:
        a state or an environment of the image display apparatus includes a communication capable status indicating whether the image display apparatus is capable of performing communications, and
        the setting sets the time required for shifting to the energy-saving state in accordance with a result determined by the determining.

2. The image display apparatus as claimed in claim 1, the processing circuitry further configured to perform:
    searching for a communication apparatus capable of operating the image display apparatus over the network,
    wherein:
        the state or the environment of the image display apparatus further includes an image display apparatus environment indicating whether there is a communication apparatus capable of operating the image display apparatus over the network, and the setting sets the time required for shifting to the energy-saving state in accordance with the determination made by the determining indicating whether the image display apparatus is in the communication capable status, and the detected result of the presence or absence of a communication apparatus capable of operating the image display apparatus over the network obtained by the searching.

3. The image display apparatus as claimed in claim 1, wherein the processing circuitry is further to perform:

execution determining whether execution request data for requesting execution of a process unexecutable in the energy-saving state has been received within a predetermined period, wherein:

the state or the environment of the image display apparatus further includes an image display apparatus state indicating whether the execution request data for requesting execution of the process unexecutable in the energy-saving state have been received within a predetermined period, and the setting sets the time required for shifting to the energy-saving state in accordance with the determination made by the determining indicating whether the image display apparatus is in the communication capable status, and the result of whether the execution request data for requesting execution of the process unexecutable in the energy-saving state has been received within the predetermined period determined by the execution determining execution request data receipt determination.

4. The image display apparatus as claimed in claim 1, wherein the processing circuitry is further configured to perform:

process status determining to determine whether the process unexecutable in the energy-saving state is in execution, or whether the process unexecutable in the energy-saving state has been scheduled for execution, wherein:

the state or the environment of the image display apparatus further includes an image display apparatus state indicating whether the process unexecutable in the energy-saving state is in execution, or whether the process unexecutable in the energy-saving state has been scheduled for execution, and the setting sets the time required for shifting to the energy-saving state in accordance with the determining indicating whether the image display apparatus is in the communication capable status, and the result of whether the process unexecutable in the energy-saving state is in execution, or whether the process unexecutable in the energy-saving state has been scheduled for execution determined by the process status determining.

5. The image display apparatus as claimed in claim 1, wherein the processing circuitry is further configured to perform:

a lamp usable time calculating that calculates a remaining usable time of the lamp based on a maximum usable time of a lamp provided with the image display apparatus and an accumulated value of the usable time of the lamp, wherein:

the state or the environment of the image display apparatus further includes an image display apparatus state indicating the usable time of the lamp provided with the image display apparatus, and the setting sets the time required for shifting to the energy-saving state in accordance with the remaining usable time of the lamp obtained by the lamp usable time calculating.

6. The image display apparatus as claimed in claim 1, further comprising:

a memory configured to store a number of processes unexecutable in the energy-saving state for each unit of a predetermined divided time span, wherein:

the state or the environment of the image display apparatus further includes an image display apparatus environment indicating the number of processes unexecutable in the energy-saving state for each unit of the predetermined divided time span, and the setting sets the time required for shifting to the energy-saving state in accordance with the number of processes unexecutable in the energy-saving state for each unit of the predetermined divided time span stored by the memory.

7. The image display apparatus as claimed in claim 1, wherein:

the energy-saving state includes a different energy-saving state for each of functions to limit the execution, and the shifting further includes specifying one of the energy-saving states, and wherein the setting sets the time required for shifting to the energy-saving state in accordance with the specified one of the energy-saving states, and the state or the environment of the image display apparatus.

8. An image display system including an image display apparatus capable of performing communications via a network, the image display system comprising processing circuitry configured to perform:

shifting an energy state of the image display apparatus to an energy-saving state in which energy consumption of the image display apparatus is suppressed;

setting a time required for shifting to the energy-saving state in accordance with a state or an environment of the image display apparatus connected via the network;

detecting a presence or an absence of data input into the image display apparatus; and detecting whether an operation on the image display apparatus is being performed by a user, wherein when no data input is detected by the detecting the presence or the absence and no operation on the image display apparatus being performed by the user is detected by the detecting of the operation on the image display apparatus, and when the time required for shifting to the energy-saving state set by the setting has elapsed, the shifting shifts the energy state of the image display apparatus connected via the network to the energy-saving state, the processing circuitry further co figured to perform:

determining whether the image display apparatus is in a state capable of performing communications, wherein:

the state or the environment of the image display apparatus includes a communication capable status indicating whether the image display apparatus is capable of performing communications, and the setting sets the time required for shifting to the energy-saving state in accordance with a result determined by the determining.

9. An image display apparatus capable of performing communications via a network, the image display apparatus comprising:
- energy-saving state shifting means for shifting an energy state to an energy-saving state in which energy consumption is suppressed;
- shifting time setting means for setting a time required for shifting to the energy-saving state in accordance with a state or an environment of the image display apparatus;
- data input detection means for detecting a presence or an absence of data input into the image display apparatus; and
- operations detection means for detecting whether an operation on the image display apparatus is being performed by a user,
- wherein when no data input is detected by the data input detection means and no operation on the image display apparatus being performed by the user is detected by the operations detection means, and when the time required for shifting to the energy-saving state set by the shifting time setting means has elapsed, the energy-saving state shifting means shifts the energy state to the energy-saving state in which energy consumption is suppressed,
- the image display apparatus further comprising:
- communication capability determination means configured to determine whether the image display apparatus is in a state capable of performing communications, wherein:
- the state or the environment of the image display apparatus includes a communication capable status indicating whether the image display apparatus is capable of performing communications, and
- the shifting time setting means sets the time required for shifting to the energy-saving state in accordance with a result determined by the communication capability determination means.

10. The image display apparatus as claimed in claim 9, further comprising:
- communication apparatus searching means for searching for a communication apparatus capable of operating the image display apparatus over the network, wherein:
- the state or the environment of the image display apparatus further includes an image display apparatus environment indicating whether there is a communication apparatus capable of operating the image display apparatus over the network, and
- the shifting time setting means sets the time required for shifting to the energy-saving state in accordance with the determination made by the communication capability determination means indicating whether the image display apparatus is in the communication capable status, and the detected result of the presence or absence of a communication apparatus capable of operating the image display apparatus over the network obtained by the communication apparatus search means.

11. The image display apparatus as claimed in claim 9, further comprising:
- execution request data receipt determination means for determining whether execution request data for requesting execution of a process unexecutable in the energy-saving state have been received within a predetermined period,
- wherein:
- the state or the environment of the image display apparatus further includes an image display apparatus state indicating whether the execution request data for requesting execution of the process unexecutable in the energy-saving state have been received within a predetermined period, and
- the shifting time setting means sets the time required for shifting to the energy-saving state in accordance with the determination made by the communication capability determination means indicating whether the image display apparatus is in the communication capable status, and the result of whether the execution request data for requesting execution of the process unexecutable in the energy-saving state have been received within the predetermined period determined by the execution request data receipt determination means.

12. The image display apparatus as claimed in claim 9, further comprising:
- process status determination means for determining whether the process unexecutable in the energy-saving state is in execution, or whether the process unexecutable in the energy-saving state has been scheduled for execution,
- wherein:
- the state or the environment of the image display apparatus further includes an image display apparatus state indicating whether the process unexecutable in the energy-saving state is in execution, or whether the process unexecutable in the energy-saving state has been scheduled for execution, and
- the shifting time setting means sets the time required for shifting to the energy-saving state in accordance with the determination made by the communication capability determination means indicating whether the image display apparatus is in the communication capable status, and the result of whether the process unexecutable in the energy-saving state is in execution, or whether the process unexecutable in the energy-saving state has been scheduled for execution determined by the process status determination means.

13. The image display apparatus as claimed in claim 9, further comprising:
- lamp usable time calculation means for calculating a remaining usable time of the lamp based on a maximum usable time of a lamp provided with the image display apparatus and an accumulated value of the usable time of the lamp,
- wherein:
- the state or the environment of the image display apparatus further includes an image display apparatus state indicating the usable time of the lamp provided with the image display apparatus, and
- the shifting time setting means sets the time required for shifting to the energy-saving state in accordance with the remaining usable time of the lamp obtained by the lamp usable time calculation means.

14. The image display apparatus as claimed in claim 9, further comprising:
- a memory configured to store a number of processes unexecutable in the energy-saving state for each unit of a predetermined divided time span,
- wherein:
- the state or the environment of the image display apparatus further includes an image display apparatus environment indicating the number of processes unexecutable in the energy-saving state for each unit of the predetermined divided time span, and the shifting time setting means sets the time required for shifting to the energy-saving state in accordance with the number of processes unexecutable in the energy-saving state for each unit of the predetermined divided time span stored by the memory.

15. The image display apparatus as claimed in claim 9, wherein:

the energy-saving state includes a different energy-saving state for each of functions to limit the execution, and the energy-saving state shifting means further includes shifting destination specification means for specifying one of the energy-saving states, and wherein the shifting time setting means sets the time required for shifting to the energy-saving state in accordance with the specified one of the energy-saving states, and the state or the environment of the image display apparatus.

* * * * *